(12) United States Patent
Hayes

(10) Patent No.: US 12,132,638 B2
(45) Date of Patent: Oct. 29, 2024

(54) PROCESSING ADVERTISEMENT MESSAGES IN A MESH NETWORK

(71) Applicant: Lutron Technology Company LLC, Coopersburg, PA (US)

(72) Inventor: Jeffrey S. Hayes, Allentown, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

(21) Appl. No.: 18/233,109

(22) Filed: Aug. 11, 2023

(65) Prior Publication Data

US 2023/0388217 A1 Nov. 30, 2023

Related U.S. Application Data

(63) Continuation of application No. 17/110,030, filed on Dec. 2, 2020, now Pat. No. 11,770,324.

(Continued)

(51) Int. Cl.
*G06F 15/16* (2006.01)
*H04L 12/28* (2006.01)
(Continued)

(52) U.S. Cl.
CPC ........ *H04L 45/021* (2013.01); *H04L 12/2832* (2013.01); *H04L 45/16* (2013.01); *H04L 47/34* (2013.01)

(58) Field of Classification Search
CPC .... H04L 45/021; H04L 45/16; H04L 12/2832
See application file for complete search history.

(56) References Cited

U.S. PATENT DOCUMENTS

| 948,000 A | 2/1910 | Talbot |
| 5,086,228 A | 2/1992 | Kojima |

(Continued)

FOREIGN PATENT DOCUMENTS

| CN | 107926103 A | 4/2018 |
| CN | 109417508 A | 3/2019 |

(Continued)

OTHER PUBLICATIONS

Kim, et al., "Scalable Network Joining Mechanism in Wireless Sensor Networks", IEEE, Research Gate, Jan. 2012, 5 pages.

(Continued)

*Primary Examiner* — Hieu T Hoang
(74) *Attorney, Agent, or Firm* — Flaster Greenberg P.C.

(57) ABSTRACT

A load control system may include a network of devices configured to communicate with one another. The load control system may include control devices configured to operate as a leader device or another router device on the network. The control device may process advertisement messages from other router devices in the network. The control device may receive advertisement messages from non-leader router devices and compare the device identifier and the sequence number in the advertisement messages with the device identifier and the sequence number in previously-received advertisement messages from the non-leader router devices. The control device may process each advertisement message received with a different sequence identifier or a different device identifier than previously received advertisement messages from the non-leader router devices. The control device may ignore each advertisement message received with the same sequence identifier from the same non-leader router device as a previously received advertisement message.

31 Claims, 15 Drawing Sheets

Related U.S. Application Data

(60) Provisional application No. 62/942,684, filed on Dec. 2, 2019.

(51) Int. Cl.
*H04L 45/021* (2022.01)
*H04L 45/16* (2022.01)
*H04L 47/34* (2022.01)

(56) References Cited

U.S. PATENT DOCUMENTS

| | | | |
|---|---|---|---|
| 5,086,428 A | 2/1992 | Perlman et al. | |
| 5,564,090 A | 10/1996 | Beauchamp et al. | |
| 5,634,010 A | 5/1997 | Ciscon et al. | |
| 5,838,226 A | 11/1998 | Houggy et al. | |
| 5,848,054 A | 12/1998 | Mosebrook et al. | |
| 5,905,442 A | 5/1999 | Mosebrook et al. | |
| 6,209,039 B1 | 3/2001 | Albright et al. | |
| 6,262,976 B1 | 7/2001 | McNamara | |
| 6,879,806 B2 | 4/2005 | Shorty | |
| 7,184,421 B1 | 2/2007 | Liu et al. | |
| 7,277,931 B1 | 10/2007 | Booth et al. | |
| 7,391,297 B2 | 6/2008 | Cash et al. | |
| 7,447,800 B2 | 11/2008 | Kobayashi et al. | |
| 7,606,187 B2 | 10/2009 | Zeng et al. | |
| 7,787,424 B2 | 8/2010 | Kang et al. | |
| 7,839,791 B2 | 11/2010 | Holmer et al. | |
| 8,009,042 B2 | 8/2011 | Steiner et al. | |
| 8,149,690 B1 | 4/2012 | Kakkar | |
| 8,170,033 B1 | 5/2012 | Kothari et al. | |
| 8,199,010 B2 | 6/2012 | Sloan et al. | |
| 8,228,184 B2 | 7/2012 | Blakeley et al. | |
| 8,306,062 B1* | 11/2012 | Cohen | H04L 69/161 370/473 |
| 8,330,638 B2 | 12/2012 | Altonen et al. | |
| 8,386,613 B2 | 2/2013 | Hopkins | |
| 8,410,706 B2 | 4/2013 | Steiner et al. | |
| 8,451,116 B2 | 5/2013 | Steiner et al. | |
| 8,950,461 B2 | 2/2015 | Adams et al. | |
| 9,125,215 B2 | 9/2015 | Bahr | |
| 9,178,798 B2 | 11/2015 | Esale et al. | |
| 9,488,000 B2 | 11/2016 | Kirby et al. | |
| 9,655,214 B1 | 5/2017 | Sooch | |
| 9,655,215 B1 | 5/2017 | Ho et al. | |
| 10,027,127 B2 | 7/2018 | Crafts et al. | |
| 10,098,074 B2 | 10/2018 | Baker et al. | |
| 10,116,367 B1 | 10/2018 | Sakoda | |
| 10,264,651 B2 | 4/2019 | Steiner | |
| 10,285,112 B2 | 5/2019 | Zhang et al. | |
| 10,299,356 B1 | 5/2019 | Quilling et al. | |
| 10,379,505 B2 | 8/2019 | Barco et al. | |
| 10,382,323 B1 | 8/2019 | Dave et al. | |
| 10,461,827 B2 | 10/2019 | Sakoda | |
| 10,680,899 B1 | 6/2020 | Ibarra | |
| 10,715,599 B2 | 7/2020 | Hao et al. | |
| 10,813,058 B2 | 10/2020 | Qiu | |
| 10,939,353 B2 | 3/2021 | Kamp et al. | |
| 11,405,283 B2 | 8/2022 | Chen | |
| 11,722,377 B2 | 8/2023 | Hayes | |
| 2003/0031155 A1 | 2/2003 | Idehara | |
| 2004/0196858 A1 | 10/2004 | Tsai et al. | |
| 2004/0202158 A1 | 10/2004 | Takeno et al. | |
| 2006/0067282 A1 | 3/2006 | Sherman et al. | |
| 2006/0149851 A1 | 7/2006 | Matsumoto et al. | |
| 2006/0291485 A1 | 12/2006 | Thubert et al. | |
| 2006/0291659 A1* | 12/2006 | Watanabe | H04W 12/062 380/270 |
| 2007/0025274 A1* | 2/2007 | Rahman | H04W 40/26 370/254 |
| 2007/0265790 A1 | 11/2007 | Sealing et al. | |
| 2008/0031129 A1 | 2/2008 | Arseneault et al. | |
| 2008/0036589 A1 | 2/2008 | Werb et al. | |
| 2008/0092075 A1 | 4/2008 | Jacob et al. | |
| 2008/0117907 A1 | 5/2008 | Hein | |
| 2008/0170518 A1 | 7/2008 | Duggi et al. | |
| 2008/0205385 A1* | 8/2008 | Zeng | H04W 72/30 370/389 |
| 2008/0240078 A1 | 10/2008 | Thubert et al. | |
| 2009/0135824 A1* | 5/2009 | Liu | H04L 45/32 370/432 |
| 2009/0185617 A1 | 7/2009 | Houghton et al. | |
| 2009/0206983 A1 | 8/2009 | Knode et al. | |
| 2009/0245252 A1 | 10/2009 | Konishi et al. | |
| 2010/0046430 A1* | 2/2010 | Naito | H04W 28/14 370/328 |
| 2010/0165885 A1 | 7/2010 | Chang et al. | |
| 2010/0177660 A1 | 7/2010 | Essinger et al. | |
| 2010/0265836 A1 | 10/2010 | Lau et al. | |
| 2010/0278187 A1 | 11/2010 | Hart et al. | |
| 2011/0242968 A1 | 10/2011 | Cirkovic et al. | |
| 2012/0182865 A1 | 7/2012 | Andersen et al. | |
| 2012/0286940 A1 | 11/2012 | Carmen et al. | |
| 2013/0030589 A1 | 1/2013 | Pessina et al. | |
| 2013/0107909 A1 | 5/2013 | Jones et al. | |
| 2013/0197955 A1 | 8/2013 | Dillon | |
| 2013/0258872 A1 | 10/2013 | Drake et al. | |
| 2013/0336170 A1 | 12/2013 | Broadworth et al. | |
| 2014/0012961 A1* | 1/2014 | Pope | H04L 69/323 709/220 |
| 2014/0173056 A1 | 6/2014 | Lear et al. | |
| 2014/0175875 A1 | 6/2014 | Newman et al. | |
| 2014/0177469 A1 | 6/2014 | Neyhart | |
| 2014/0180487 A1 | 6/2014 | Bull | |
| 2014/0210616 A1 | 7/2014 | Ramachandran | |
| 2014/0244834 A1 | 8/2014 | Guedalia et al. | |
| 2014/0265568 A1 | 9/2014 | Crafts et al. | |
| 2014/0281670 A1 | 9/2014 | Vasseur et al. | |
| 2014/0347981 A1 | 11/2014 | Rangne et al. | |
| 2015/0043562 A1 | 2/2015 | Shu | |
| 2015/0085830 A1 | 3/2015 | Nozaki et al. | |
| 2015/0131435 A1 | 5/2015 | Kasslin et al. | |
| 2015/0179058 A1 | 6/2015 | Crafts et al. | |
| 2016/0021525 A1 | 1/2016 | Mani et al. | |
| 2016/0073342 A1 | 3/2016 | Szewczyk et al. | |
| 2016/0119415 A1 | 4/2016 | Han et al. | |
| 2016/0219358 A1 | 7/2016 | Shaffer et al. | |
| 2016/0227481 A1 | 8/2016 | Au et al. | |
| 2016/0330107 A1 | 11/2016 | Thubert et al. | |
| 2017/0013614 A1 | 1/2017 | Chandrashekar et al. | |
| 2017/0041954 A1 | 2/2017 | Tsai et al. | |
| 2017/0068720 A1 | 3/2017 | Ko et al. | |
| 2017/0123390 A1 | 5/2017 | Barco et al. | |
| 2017/0127468 A1 | 5/2017 | Saikusa | |
| 2017/0155703 A1 | 6/2017 | Hao et al. | |
| 2017/0223809 A1 | 8/2017 | Oliver et al. | |
| 2017/0230231 A1 | 8/2017 | Hsu et al. | |
| 2017/0245132 A1 | 8/2017 | Tsuchie | |
| 2018/0014387 A1 | 1/2018 | Bard et al. | |
| 2018/0035374 A1 | 2/2018 | Borden et al. | |
| 2018/0167547 A1 | 6/2018 | Casey et al. | |
| 2018/0220476 A1 | 8/2018 | Jung et al. | |
| 2018/0227145 A1 | 8/2018 | Brochi et al. | |
| 2018/0331940 A1 | 11/2018 | Jadhav et al. | |
| 2018/0347271 A1 | 12/2018 | Cooney et al. | |
| 2018/0368048 A1 | 12/2018 | Tsuchie | |
| 2019/0104463 A1 | 4/2019 | Khoury | |
| 2019/0268797 A1 | 8/2019 | Pang et al. | |
| 2019/0312770 A1 | 10/2019 | Bidgoli et al. | |
| 2019/0394667 A1 | 12/2019 | Shariati | |
| 2020/0044707 A1 | 2/2020 | Sakoda | |
| 2020/0052997 A1 | 2/2020 | Ramanathan et al. | |
| 2020/0100138 A1 | 3/2020 | Wu et al. | |
| 2020/0169355 A1 | 5/2020 | McIlroy | |
| 2020/0403866 A1 | 12/2020 | Hayes et al. | |
| 2020/0403877 A1 | 12/2020 | Hayes et al. | |
| 2020/0404513 A1 | 12/2020 | Hayes et al. | |
| 2021/0014148 A1 | 1/2021 | Heitz et al. | |
| 2021/0014770 A1 | 1/2021 | Qi et al. | |
| 2021/0194766 A1 | 6/2021 | Crafts et al. | |
| 2021/0243173 A1 | 8/2021 | D'Alessandro et al. | |
| 2021/0352002 A1 | 11/2021 | Knode | |
| 2022/0015172 A1 | 1/2022 | Xu et al. | |
| 2022/0053407 A1 | 2/2022 | Zhou | |

(56) References Cited

U.S. PATENT DOCUMENTS

| | | |
|---|---|---|
| 2022/0191309 A1* | 6/2022 | Zhi ................... H04L 43/12 |
| 2022/0210715 A1 | 6/2022 | Deixler et al. |
| 2022/0351628 A1 | 11/2022 | Ali et al. |
| 2023/0284363 A1 | 9/2023 | Baker et al. |

FOREIGN PATENT DOCUMENTS

| | | |
|---|---|---|
| CN | 109691183 A | 4/2019 |
| CN | 109788500 A | 5/2019 |
| EP | 1443722 A2 | 8/2004 |
| EP | 1594266 A1 | 11/2005 |
| EP | 3048762 A1 | 7/2016 |
| KR | 20120060576 A | 6/2012 |
| KR | 20190058352 A | 5/2019 |
| WO | 2012048585 A1 | 4/2012 |

OTHER PUBLICATIONS

Lee, et al., "Monitoring of Large-area IoT Sensors Using a LoRa Wireless Mesh Network System: Design and Evaluation", IEEE, ResearchGate, Mar. 2018, 12 pages.

Yoo, et al., "A2S: Automated Agriculture System Based on WSN", IEEE, Research Gate, Jul. 2007, 6 pages.

Lin, Deyu, et al., "An Energy-Efficient Clustering Algorithm Combined Game Theory and Dual-Custer-Head Mechanism for WSNs", IEE Access, vol. 7 DOI: 10.1109/ACCESS.2019.2911190 [retrieved on Apr. 22, 2019), Apr. 15, 20019, pp. 49894-49905.

Moon, et al., "Energy Efficient Data Collection in Sink-Centric Wireless Sensor Networks: A Cluster-Ring Approach", Computer Communications, Elsevier Science Publishers BV, Amsterdam, NL, vol. 101, Jul. 4, 2016, pp. 12-25.

Parsa, et al., "Semantically Intelligent Distributed Leader Election(SIDLE) Algorithm for WSAN Part of IoT Systems", Aug. 23, 2019, 8 pages.

Saedi, et al., "Generation of realistic signal strength measurements for a 5G Rogue Base Station attack scenario", Jul. 2020, 8 pages.

Thread Group, Inc., "Thread Specification", Revision 1.1.1, Feb. 13, 2017, 348 pages.

\* cited by examiner

LINK QUALITY AND LINK COST

| Link Quality | Link Cost |
|---|---|
| 0 | Unknown/Indefinite |
| 1 | 4 |
| 2 | 2 |
| 3 | 1 |

PROCESSING ADVERTISEMENT MESSAGES IN A MESH NETWORK

CROSS-REFERENCE TO RELATED APPLICATIONS

This application is a continuation of U.S. Non-Provisional patent application Ser. No. 17/110,030, filed Dec. 2, 2020, which claims the benefit of U.S. Provisional Patent Application No. 62/942,684, filed Dec. 2, 2019, the entire disclosure of which is hereby incorporated by reference herein.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. A heating, ventilation, and air conditioning (HVAC) system may be used to control the temperature in the user environment.

Each load control system may include various control devices, including input devices and load control devices. The control devices may receive messages, which may include load control instructions, for controlling an electrical load from one or more of the input devices. The control devices may be capable of directly controlling an electrical load. The input devices may be capable of indirectly controlling the electrical load via the load control device. Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color temperature sensors, temperature sensors, and/or the like. Remote control devices may receive user input for performing load control.

SUMMARY

A load control system may include control devices configured to communicate via a network. The network may include router devices (e.g., a leader device and other router devices) for enabling communication of messages throughout the network. The leader device may generate a sequence number for being used in advertisement messages transmitted between router devices in the network.

A control device may operate as a router device in the network. The control device may receive an advertisement message from the leader device. The advertisement message may include an identifier of the leader device and a sequence number. The control device may process the advertisement message from the leader device and store the identifier of the second router device and the sequence number in the advertisement message. The control device may use the sequence number in subsequent advertisement messages transmitted from the control device.

The control device may receive an advertisement messages from non-leader router devices. The advertisement messages from the non-leader router devices may comprises respective identifiers of the non-leader router devices and the sequence number. The control device may compare the device identifier and the sequence number in the advertisement messages with the device identifier and the sequence number in previously-received advertisement messages from the non-leader router devices. The control device may process each advertisement message received with a different sequence identifier or a different device identifier than previously received advertisement messages from the non-leader router devices. The control device may ignore each advertisement message received with the same sequence identifier from the same non-leader router device as a previously received advertisement message.

The processing of the advertisement messages may include updating a locally-stored router table at the control device based on network information received in the advertisement messages. The network information may include at least one of a link quality, link cost, or path cost for communicating messages on a communication link. The network information may be used to update the locally-stored router table at the control device to improve the communication of messages on the network.

BRIEF DESCRIPTION OF THE DRAWINGS

FIG. 2F is a table that illustrates example link costs that may correspond to different link qualities.

DETAILED DESCRIPTION

Figure 1:
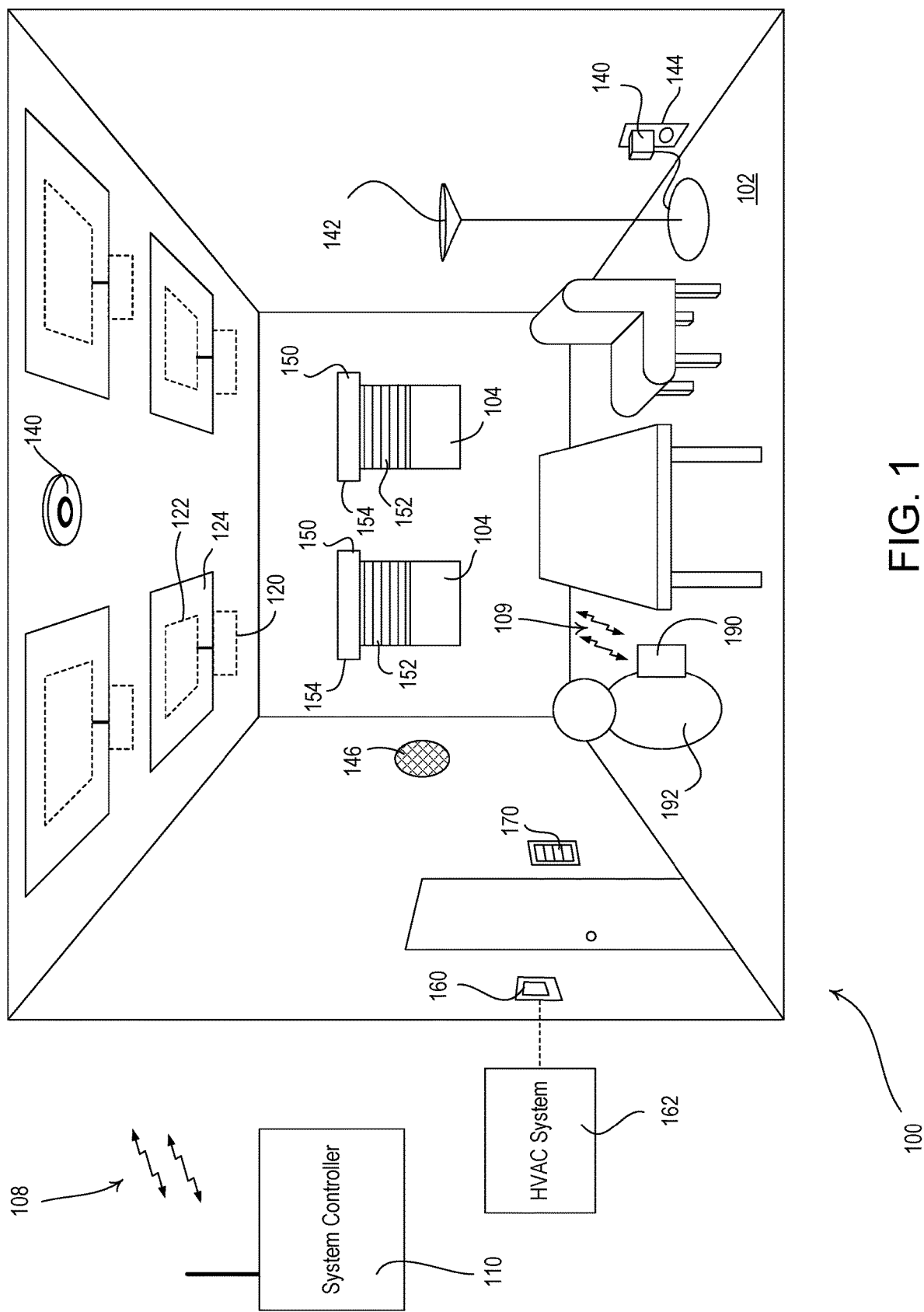
FIG. 1 is a diagram of an example load control system.

FIG. 1 is a diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit messages in response to user inputs, occupancy/vacancy conditions, changes in measured light intensity, etc.) and a number of control-target devices (e.g., load control devices operable to receive messages and control respective electrical loads in response to the received messages). A single control device of the load control system 100 may operate as both a control-source and a control-target device.

The control-source devices may be configured to transmit messages directly to the control-target devices. In addition, the load control system 100 may comprise a system controller 110 (e.g., a central processor or load controller) operable to communicate messages to and from the control devices (e.g., the control-source devices and/or the control-target devices). For example, the system controller 110 may be configured to receive messages from the control-source devices and transmit messages to the control-target devices in response to the messages received from the control-source devices. The control-source and control-target devices and the system controller 110 may be configured to transmit and receive the RF signals 108 using a proprietary RF protocol, such as the CLEAR CONNECT protocol (e.g., CLEAR CONNECT TYPE A and/or CLEAR CONNECT TYPE X protocols). Alternatively, the RF signals 108 may be transmitted using a different RF protocol, such as, a standard protocol, for example, one of WIFI, BLUETOOTH, BLUETOOTH LOW ENERGY (BLE), ZIGBEE, Z-WAVE, THREAD, KNX-RF, ENOCEAN RADIO protocols, or a different proprietary protocol.

The load control system 100 may comprise one or more load control devices, e.g., lighting control device 120, for controlling a lighting load, e.g., lighting loads 122 in lighting fixture 124. For example, the lighting control devices 120 may comprise light-emitting diode (LED) drivers and the lighting loads 122 may comprise LED light sources. While each lighting fixture 124 is shown having a single lighting load 122, each lighting fixture 124 may comprise one or more individual light sources (e.g., lamps and/or LED emitters) that may be controlled individually and/or in unison by the respective lighting control device 120.

The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150, such as motorized cellular shades, for controlling the amount of daylight entering the room 102. Each motorized window treatments 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the room 102. The motor drive units of the motorized window treatments 150 may be configured to receive messages via the RF signals 108 (e.g., from the system controller 110) and adjust the position of the respective window treatment fabric 152 in response to the received messages. For example, the motorized window treatments may be battery-powered. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive messages via the RF signals 108 (e.g., from the system controller 110) and adjust heating, ventilation, and cooling in response to the received messages.

The load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive messages via the RF signals 108 (e.g., from the system controller 110) and to turn on and off or adjust the intensity of the floor lamp 142 in response to the received messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more input devices, e.g., such as a remote control device 170 and/or the sensor device 140. The input devices may be fixed or movable input devices. The system controller 110 may be configured to transmit one or more messages to the load control devices (e.g., the lighting control device 120, the plug-in load control device 140, the motorized window treatments 150, and/or the thermostat 160) in response to the messages received from the remote control device 170. The remote control device 170 may be configured to transmit messages directly to the lighting control device 120, the plug-in load control device 140, the motorized window treatments 150, and/or the temperature control device 160.

The remote control device 170 may be configured to transmit messages via the RF signals 108 to the system controller 110 (e.g., directly to the system controller) in response to an actuation of one or more buttons of the remote control device. For example, the remote control device 170 may be battery-powered. The load control system 100 may comprise other types of input devices, such as, for example, temperature sensors (e.g., sensor 140), humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more network devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 190 may be configured to transmit messages to the system controller 110, for example, in one or more Internet Protocol packets. For example, the mobile device 190 may be configured to transmit messages to the system controller 110 over the LAN and/or via the Internet. The mobile device 190 may be configured to transmit messages over the internet to an external service, and then the messages may be received by the system controller 110. The mobile device 190 may transmit and receive RF signals 109. The RF signals 109 may be the same signal type and/or transmitted using the same protocol as the RF signals 108. Alternatively, or additionally, the mobile device 190 may be configured to transmit RF signals according to another signal type and/or protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using, for example, the mobile device 190 or other network device (e.g., when the mobile device is a personal computing device). The mobile device 190 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the lighting control device 120, the plug-in load control device 140, the motorized window treatments 150, and/or the thermostat 160). The load control database may comprise association information that identifies associations between the load control devices and the input devices (e.g., the remote control device 170, etc.). The associations may comprise device identifiers that are stored together, such that devices may recognize the identifiers of associated devices to enable communication between the devices. Devices may recognize the stored identifiers of associated devices and communicate messages to and/or identify messages received from the associated devices. The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosure of which is hereby incorporated by reference.

The control devices of the load control system may communicate with each other via a network. For example, the control devices may join the network by initiating a joining procedure. During the joining procedure, the control devices may send and receive joining messages, and the joining messages may be used to exchange credentials with a network commissioning device. After exchanging credentials, a control device may be provided with a network key, which may enable the control device to communicate over the network. The control devices may each then attempt to attach to another device (e.g., a router device) joined to the network, forming a mesh network. For example, a control device may attempt to attach to another device joined to the network by initiating an attachment procedure with the other device. As described herein, a control device may send and/or receive attachment messages to the other device on a network during the attachment procedure. And, based on the type of attachment message transmitted during an attachment procedure, the control device may establish a link (e.g., parent-child link, auxiliary parent link, router-to-router link) with the router device. For example, the control device may transmit attachment messages configured to establish a parent-child link (e.g., parent-request messages and/or parent-response messages) during an attachment procedure to establish a parent-child link with the router device, such that the control device may become a child device of the router device and the router device may become a parent device of the control device. Similarly, the control device may transmit attachment messages configured to establish an auxiliary parent link (e.g., link-request messages and/or link-response messages) during an attachment procedure to establish an auxiliary parent link with the router device. After establishing a parent-child link, the control device may transmit and receive messages over the network through the other device. As described herein, the router device that a respective control device is attached to may be also be referred to as the parent device of the control device.

A control device may also attach to and establish links with additional devices (e.g., router devices) joined to a network. For example, a control device may initiate an attachment procedure to attach to an additional router device (e.g., a router device that is not the parent device of the control device). As a result of the attachment procedure, the control device may establish an auxiliary parent link with the other router device, such that the other device becomes an auxiliary parent of the control device. And during the attachment procedure, for example, the control device may send and receive a number of attachment messages configured to establish an auxiliary parent link, such as link-request messages or link-response messages, to/from the other router device. Control devices may receive and process messages from the auxiliary parent devices that they are attached to (e.g., in addition to the parent device they are attached to), which may increase the reliability of the network information received in the network. As described herein, the process of control devices joining a network (e.g., via a joining procedure), and/or attaching to another device already joined to the network (e.g., via an attachment procedure) may be referred to as network formation.

During network formation, as described herein, a plurality of control devices may join a network and attach to other devices already joined to the network (e.g., via an attachment procedure with another device). The plurality of control may, however, each initiate their respective attachment procedures, which includes sending and receiving attachment messages over the network at the same or substantially the same time. As a result, multiple control devices may transmit attachment messages on the network at the same or substantially the same time. When multiple devices send messages over the network at the same or substantially the same time, the messages may collide with each other and/or result in the messages failing to be received. Message collisions during network formation may, for example, cause the attachment messages to fail to be received, delaying network formation and installation and/or operation of the load control system.

As the scale of a network installation increases (e.g., the number of devices attached to the network), the number of collisions that occur during network formation may increase. In addition, after a control device continually fails to attach to the network (e.g., as a result of message collisions and/or lack of connectivity with an already formed network), the device may attempt to form another network (e.g., a network partition). The network partitions may communicate in parallel with one another, but may not communicate with each other (e.g., at least for a period of time and/or until the network partitions combine into a single network partition). For example, the devices attached to a first network partition may not be able to communicate with the device attached to a second network partition. As communication links are established between devices in a location, each network may grow and one or more devices in one network may join the other network. The devices that leave a network may cause undue processing delay for the devices that remain on the network, as the devices reconfigure and/or discover their roles in the network.

Figure 2A:
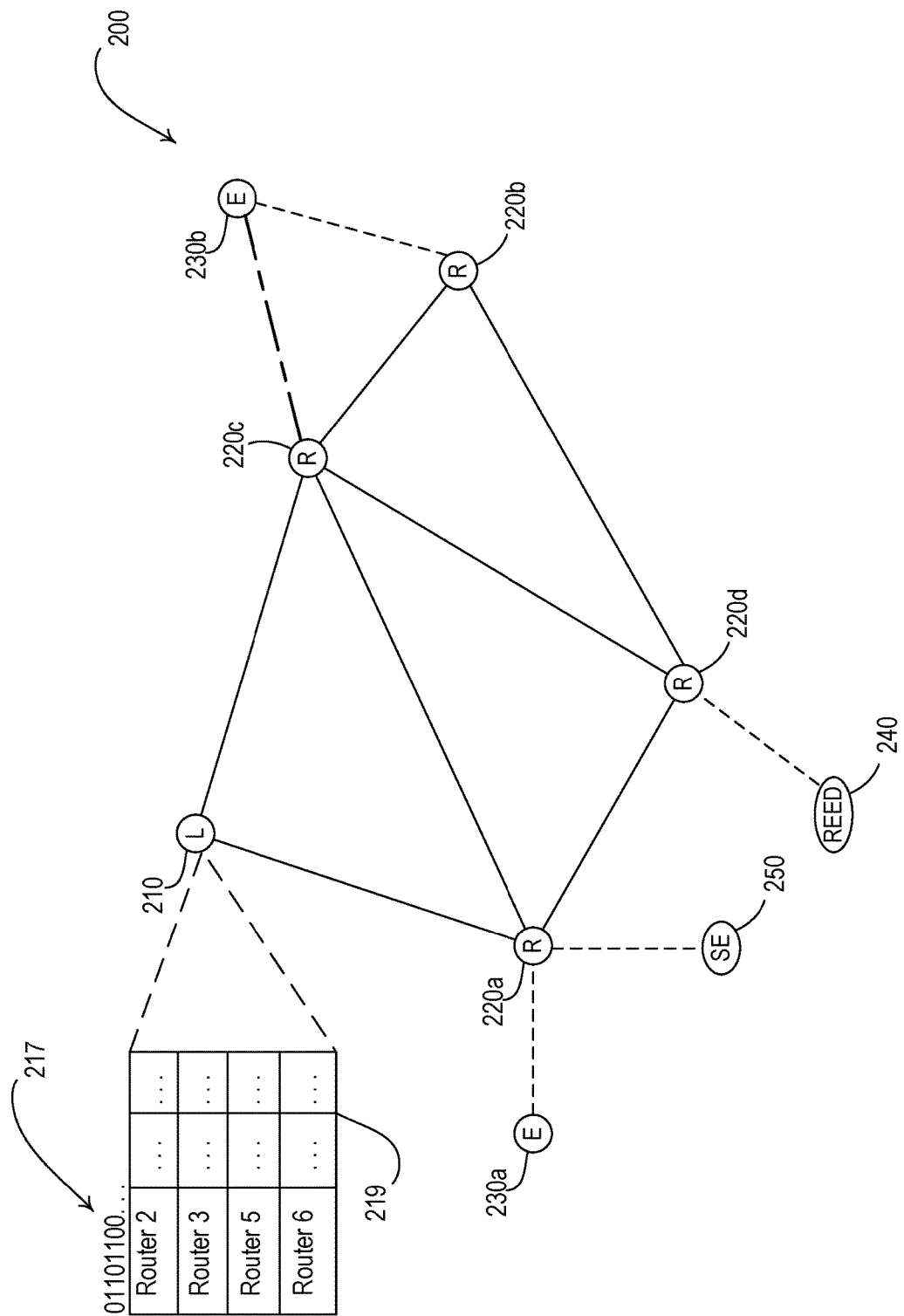
FIG. 2A is a diagram of an example network that may allow for communication between devices in the load control system of FIG. 1.

FIG. 2A is an illustration of an example network 200 that may allow for communication between control devices in a load control system (e.g., the load control system 100). The network 200 may include any suitable network to facilitate communications in a load control system. For example, the network 200 may be a mesh network on which control devices communicate using a mesh network wireless communication protocol (e.g., the THREAD protocol or other suitable protocol). The various control devices of the load control system 100 may communicate with each other via the network 200. As shown in FIG. 2A, the network 200 may comprise a single network partition. In addition, the network 200 may be an example of a network partition (e.g., a subnetwork or subnet) within a larger network. For example, the network 200 may be an example of a network partition within a larger network composed of a plurality of network partitions. The network 200 is an example network and the techniques described herein may be applied to other networks, for example, that include more control devices or less control devices than the network 200.

The circled nodes of FIG. 2A may represent devices that are attached to other devices on the network 200 (e.g., the various control devices of the load control system 100). A control device that is attached to at least one other control device on the network 200 may communicate with the other control devices (e.g., that are attached to another control device on the network 200). Communication within the network 200 may be facilitated by the links (e.g., attachments) established within the network 200. Referring to FIG. 2A, the links between the devices may be indicated by lines (e.g., solid and dashed lines) that connect the respective control devices.

The control devices that are attached to at least one other device on the network 200 may take on and/or be assigned a respective role in the network. For example, the roles may include: a leader device (e.g., leader device 210), a router device (e.g., router devices 220a-220d), an end device (e.g., end devices 230a and 230b), a router eligible end device (REED) (e.g., router eligible end device 240), a parent device, a child device and/or a sleepy end device (e.g., sleepy end device 250). The role of a control device may indicate the functions and/or capabilities of the control device with respect to the network 200. As described herein, end device may include and/or may be used to device end devices (e.g., end devices 230*a* and 230*b*), a router eligible end devices (e.g., router eligible end device 240), and/or a sleepy end devices (e.g., sleepy end device 250).

As illustrated in FIG. 2A, the network 200 may include a leader device 210 and one or more router devices 220*a*-220*d*. The leader device 210 may manage other control devices on the network 200. For example, the leader device 210 may assign and maintain router identifiers (e.g., router IDs) for each of the router devices 220. For example, each of the router devices 220*a*-220*d* may be assigned a unique router identifier. The leader device 210 may assign and maintain the roles of other devices. The leader device 210 may be configured as the gateway for the network 200. For example, the leader device may be a control device that facilitates communication (e.g., routes and receives messages to and from) between the network 200 and other networks or network partitions. Referring to FIG. 1, a system controller (e.g., the system controller 110 shown in FIG. 1) may be an example of a leader device 210. In addition, a control device within a load control system that is capable of being assigned to the role of a router device may be assigned to the role of the leader device.

The leader device 210 may support and be attached to multiple router devices (e.g., 64 router devices, 32 router devices, or another number of router devices may be defined for the network 200). The leader device 210 may operate as a router device. The router devices 220*a*-220*d* on the network 200 (e.g., attached to the leader device 210 on the network 200) may be in communication with each other, for example, to form a mesh network. The router devices 220*a*-220*d* may be in communication with one another via links (e.g., as indicated by the solid lines connecting the router devices 220*a*-220*d*). The router devices 220*a*-220*d* may be in communication with the leader device 210, either directly or through one or more other router devices (e.g., as indicated by the solid lines connecting the leader device 210 to the router devices 220*a* and 220*c*). The router devices 220*a*-220*d* may receive and route messages to other devices on the network 200 (e.g., the end devices 230*a*, 230*b*, the router eligible end device 240, and/or the sleepy end device 250). For example, the router devices 220*a*-220*d* may receive and/or transmit messages between devices, or between each other for communicating messages received from an attached device to another device attached to another router device. Referring now to the load control system 100, a device that is, for example, externally powered (e.g., a device that is not battery powered) may be assigned to the role of a router device, such as, the system controller 110, the dimmer switch 120, the LED driver 130, the plug-in load control device 140, the motorized window treatments 150, and/or the thermostat 160.

The network 200 may include one or more end devices 230*a*, 230*b* (e.g., full or minimal end devices). The end devices 230*a*, 230*b* may be attached to another device (e.g., a parent device, such as the leader device 210 and/or the router devices 220*a*, 220*b*, 220*c*, 220*d*) on the network 200 and may transmit and/or receive messages via its attached parent device (e.g., leader device and/or router device). Though two end devices 230*a*, 210*b* are shown in FIG. 2A, and each is attached to different router devices, each router device 220*a*-220*d* may support multiple end devices (e.g., more than 500 end devices). The system controller 110, input devices (e.g., the remote control device 170), and/or load control devices (e.g., the dimmer switch 120, the LED driver 130, the plug-in load control device 140, the motorized window treatments 150, and/or the thermostat 160) may be examples of the end devices 230*a*, 230*b*.

Referring again to FIG. 2A, the network 200 may include the router eligible end device 240. The router eligible end device 240 may be an end device that is capable (e.g., hardware capable and/or software capable) of becoming a leader device and/or a router device. In certain situations, the role of the router eligible end device 240 may be updated to a leader device and/or a router device. For example, when the router eligible end device 240 identifies itself as being within reach of an end device attempting to attach to the network 200, the router eligible end device 240 may upgrade itself to the role of a router device. The router eligible end device 240 may transmit and/or receive messages via the attached router device 220*d*. As shown in FIG. 2A, the router eligible end device 240 may be one of the end devices that is attached to the router device 220*d*. The system controller 110, the dimmer switch 120, the LED driver 130, the plug-in load control device 140, the motorized window treatments 150, and/or the thermostat 160 may be examples of the router eligible end device 240. Referring now to the load control system 100, a control device that is, for example, externally powered (e.g., a control device that is not battery powered) may be assigned to the role of a router eligible end device, such as, the system controller 110, the dimmer switch 120, the LED driver 130, the plug-in load control device 140, the motorized window treatments 150, and/or the thermostat 160.

The network 200 may include the sleepy end device 250. The sleepy end device 250 may include, or may be similar to, an end device. For example, the sleepy end device 250 may be an end device that is powered by a finite power source (e.g., a battery). The sleepy end device 250 may be aware of its role as a sleepy end device based on, for example, an indication that is stored at the sleepy end device 250. Communication with the sleepy end device 250 may be performed such that the finite power source is preserved and/or is efficiently consumed. For example, the sleepy end device 250 may periodically disable their respective communication circuits in between message transmissions. The sleepy end device 250 may transmit and/or receive messages via an attached router device 220*a*. As shown in FIG. 2A, the sleepy end device 250 may be one of the end devices that is attached to the router device 220*a*. Input devices (e.g., the remote control device 170) and/or load control devices (e.g., the motorized window treatments 150 when battery powered) may be examples of the sleepy end device 250. In addition, sensors and/or battery power devices may be examples of the sleepy end device 250.

The leader device 210 may update the roles (e.g., or confirm role updates) of the devices communicating within the network 200, for example, based on changes to the network 200. In an example, a control device may be assigned to a certain role when the device attaches to the network 200, and the leader device 210 may update the role of the device based on changes in network conditions. Changes in network conditions may include: increased message traffic, attachment of other devices, changes in signal strength, etc. Updates to the assigned role of a control device may be based on the capabilities of the device. For example, the leader device 210 may update the role of a control device from a router eligible end device to a router device (e.g., as a router eligible end device is an end device that is eligible to perform the role of a router device). The leader device 210 may update the role of a control device to a router device by assigning a router identifier (ID) to the device.

As the leader device 210 updates the roles of the devices in the network 200, the leader device may maintain the number of router devices in the network 200 and/or the router identifiers in use in the network 200. For example, the leader device 210 may store and/or maintain a bitmap 217 that may be used to indicate the number of router devices and/or the router identifiers being used in the network 200. The bitmap 217 may include a number of bits that each correspond to a different router identifier being used in the network 200. In an example, the leader device 210 may support 64 router devices and the leader device 210 may store a 64-bit bitmap for tracking the router identifiers in use in the network 200. Each bit in the bitmap may indicate whether a router identifier is identified by the leader device 210 as being used (e.g., with a value of "1") or unused (e.g., with a value of "0"). The leader device 210 may determine that a device should be upgraded to a router device and, so long as a router identifier is available, assign a router identifier to the router device. The leader device 210 may downgrade router devices (e.g., to end devices) or remove router devices from the network 200. As router devices are added or removed, the bitmap 217 may be updated to indicate the number of router devices and/or router identifiers that are in use in the network 200.

The leader device 210 may send the bitmap 217 to the other router devices in the network 200. Each router device, including the leader device 210, may maintain network information about each of the router devices identified as being used in the network 200. For example, each router device may maintain network information about each of the router devices in a router table, such as the router table 219. For example, the network information in the router table 219 may identify the router devices in the network 200 and the quality of communications that a corresponding router device has with the other router devices being maintained in the router table stored locally thereon. Each router table, such as the router table 219, may include a row for each router identifier indicated in the bitmap 217. Each router device in the network, including the leader device 210, may perform communications on the network 200 based on the network information being stored and maintained in the locally stored router table. For example, a router device, such as the router devices 220a-220d and/or the leader device 210, may transmit messages differently within the network 200 based on the quality of the communications with corresponding router devices identified in the router table stored locally thereon.

The control devices attached to the network 200 may further operate as parent devices and/or child devices. Leader devices (e.g., the leader device 210) and router devices (e.g., the router devices 220a-220d) that are attached to one or more end devices (e.g., the end devices 230a, 230b, the router eligible end device 240, and/or the sleepy end device 250) may operate as parent devices. End devices (e.g., the end devices 230a, 230b, the router eligible end device 240, and/or the sleepy end device 250) that are attached to a leader device (e.g., the leader device 210) or a router device (e.g., one of the router devices 220a-220d) may operate as child devices. As a parent device, the leader device 210 and the router devices 220a-220d may each be attached to one or more child devices (e.g., one or more of the end devices 230a, 230b, the router eligible end device 240, and/or the sleepy end device 250, as described herein). In addition, the leader device 210 and the router devices 220a-220d may store and/or relay messages that are sent by their respective attached child devices. For example, the leader device 210 and the router devices 220 may receive messages from their respective child devices and route the received messages to the intended recipient device (e.g., either directly to the intended recipient device, via the respective parent device of the intended recipient device, and/or to a router device or leader device this is on the path to the intended recipient). Similarly, the leader device 210 and the router devices 220a-220d may receive messages intended for their respective child device and route the message to the appropriate child device. The parent of a respective sleepy end device may schedule communications with the sleepy end device when the communication circuit of the sleepy end device is enabled.

As indicated in FIG. 2A, the relationship (e.g., attachment) between a child device and a respective parent device may be indicated by dashed lines. For example, the router device 220a may be configured as the parent device of the end device 230a and the sleepy end device 250. Similarly, the router device 220b may be configured as the parent device of the end device 230b. The router device 220a may receive messages intended for the end device 230a and forward the message to the end device 230a. As the router device 220a is configured as the parent device of the end device 230a, the end device 230a may transmit messages to the router device 220a, and the router device 220a may route the message to the intended recipient. For example, when the end device 230a intends to transmit a message to the end device 230b, the end device 230a may initially transmit the message to the router device 220a. The router device 220a may route the message to the router device 220b (e.g., the parent device of the end device 230b). For example, the router device 220a may route the message to router device 220b via router device 220c or router device 220d, and the router device 220b may then forward to message to the end device 230b. In addition, as described herein and illustrated in FIG. 2A, the router device 220a may route the message to the end device 230b via the router device 220c (e.g., the auxiliary parent device of the router device 230b).

Child devices may be configured to transmit unicast messages to their respective parent device. A control device may transmit unicast messages to another control device in the network directly or via hops through other devices in the network. Each unicast message may be individually addressed to another control device by including a unique identifier of the control device to which the unicast message being transmitted. Control devices may generate separate unicast messages for each control device with which they are communicating and address the unicast messages to each control device independently. The unicast messages may also include the unique identifier of the control device that is transmitting the unicast message. A control device may determine that it is the intended recipient of a unicast message by identifying its own unique identifier in the unicast message.

Messages may be sent in the network using multicast messages and/or broadcast messages. Multicast messages may be sent to a group of control devices in the network. A multicast message may include a group identifier. The control devices that are members of the group may recognize the group identifier and process the message accordingly. Broadcast messages may be sent to each control device in the network capable of receiving the message. The broadcast messages may include an indication that the message is a broadcast message (e.g., a broadcast address). Each device that receives a broadcast message may process the message accordingly. A network may use either multicast messages or broadcast messaged, and the two terms may be used unteachably herein.

The messages transmitted by a child device to its respective parent device may include an indication (e.g., a unique identifier) of the intended recipient, and the parent device may route the message accordingly. Referring again to FIG. 2A, the end device 230a may transmit messages to the router device 220a (e.g., the parent device of the end device 230a), and the router device 220a may route the message based on the intended recipient. For example, if the end device 230a transmits a message intended for the end device 230b, the router device 220a may route the message to the router device 220b (e.g., the parent device of the router eligible end device 230b) via the router device 220c or the router device 220d. For example, if the router device 220a routes the message via the router device 220d, the router device 220d may forward the message to the router device 220b, which may forward the message to the end device 230b. The router device 220a may identify that the router device 220b is the parent device to which the end device 230b is attached via a lookup table. As illustrated in FIG. 2A, multiple paths may exist to route messages over the network 200, and router devices may identify the shortest path (e.g., lowest number of hops) to transmit messages to a respective device.

Child devices may be configured to communicate with an auxiliary parent device (e.g., configured to communicate with more than one parent device). Referring to FIG. 2A, for example, the end device 230b may be configured to communicate with (e.g., transmit message to and receive messages from) a parent device (e.g., a primary parent device), such as the router device 220b. The end device 230b may also be configured to communicate with (e.g., receive messages from) an auxiliary parent device, such as the router device 220c (e.g., as illustrated by the long and short dashed lines in FIG. 2A). A child device may receive unicast messages from its parent device (e.g., primary parent device). A child device may also receive multicast messages (e.g., and/or broadcast messages) from its parent device (e.g., primary parent device) and one or more auxiliary parent devices, which may increase the efficiency and reliability of child device receiving the messages. For example, the child device may receive network advertisement messages via an auxiliary parent device. The number of auxiliary parents that a child device is synchronized with may be limited to a threshold number of auxiliary parents (e.g., 3, 5, 10, etc.).

A child device may be attached to a single parent device and synchronized with one or more auxiliary parent device. For example, the child device may send and/or receive unicast messages via the parent devices. Similarly, the child device may receive multicast messages via the one or more synchronized auxiliary parent devices. The number of auxiliary parent devices that a respective child device is synchronized with may be limited to a threshold number of synchronized auxiliary parents, which may be pre-defined and/or configured. A child device may attempt to synchronize with an auxiliary parent device by transmitting a message (referred to herein as a link request message) to the auxiliary parent device. For example, referring to FIG. 2A, the end device 230b may have transmitted a link request message to router 220c. The link request message may be used to request a network link between two devices. As descried herein, messages may be communicated between devices that share a network link. In response to receiving the link request message, the router device 220c may transmit a message (referred to herein as a link accept message) to the end device 230b. The link accept message may include information that allows the respective child device to decrypt messages from the auxiliary parent device (e.g., a frame counter). As described herein, when a child device is synchronized with an auxiliary parent device, the child device may receive multicast messages via the synchronized auxiliary parent device. For example, referring to FIG. 2A, the end device 230b may receive multicast messages via the parent device (e.g., router device 220b) and the auxiliary parent device (e.g., router device 220c), which may increase the efficiency and reliability of the child device 230b receiving multicast messages.

A child device may receive advertisement messages from a router device other than the parent device of the child device or a router device other than an auxiliary parent device of the child device. For example, the router device may transmit advertisement messages to enable other control devices to determine that a network has been formed and that the device hearing the advertisement message may attempt to attach to the router device (e.g., to communicate via the network). Devices may receive and track the advertisement messages transmitted by router devices to determine whether the device is able to communicate via the network. Also, or alternatively, the advertisement messages transmitted by a respective router device may provide other router devices with the ability to measure the communication signal (e.g., RSSI) between the respective routers attached to the network (e.g., which the router devices may use to update their respective routing tables or routing information). As described herein, the child device may measure a received signal strength indicator (RSSI) of the received advertisement messages.

Certain messages may be propagated and broadcast by multiple devices in the network 200, which may increase the likelihood that a respective child device hears a message. For example, rather than sending multiple transmissions, multicast messages that are substantially similar (e.g., messages that include the same load control instructions that are sent to multiple load control devices) may be broadcasted. Referring again to the load control system 100, an actuation of a button of the remote control device 170 may adjust the intensity of multiple lighting loads (e.g., the lighting load 122 and the plug-in lighting load 142) and a message may be broadcasted to adjust the respective lighting loads. In addition, the devices that receive the broadcast transmission may be configured to process and repeat (e.g., forward the message over the network or otherwise acting as a repeater) the message in response to receiving the broadcast transmission.

Child devices may create and maintain an auxiliary parent table. The auxiliary parent table may include a list of auxiliary parents with which a respective child device is configured to communicate (e.g., synchronized with and/or able to receive multicast messages from). In addition, the auxiliary parent table may include an indication of the received signal strength (e.g., an RSSI) for each of the auxiliary parent devices of the child device. For example, the auxiliary parent table may include a rolling average of the received signal strength indicators for each of the auxiliary parent devices of the child device. Child devices may similarly create and/or maintain a router table. The router table may include the router devices that a respective child device has received messages from (e.g., advertisement messages). In addition, the router table may include an indication of the RSSI of messages received from each of the router devices in the router table. Also, or alternatively, child devices may maintain a generic router table. The router table may include each of the router devices that a respective child device has received advertisement messages from and a received signal strength indicator for each of the respective router devices. The router table may also include an indication of whether a respective router is a parent of the child device or an auxiliary parent of the child device. As used herein, the term auxiliary parent table may refer to a separate table from the router table or a subset of the router table that include the router devices that are synchronized auxiliary parents of the child device.

As described herein, the network 200 may allow for communication between devices in a load control system (e.g., the load control system 100 shown in FIG. 1). The end devices 230a, 230b may include load control devices (e.g., control-target devices) and/or input devices (e.g., control-source devices) that communicate with other devices in the load control system. For example, the end device 230a may communicate with another end device and/or a router device in the load control system via RF communications.

Referring to FIG. 1, the remote control device 170 may operate as an end device or a sleepy end device for communicating messages comprising indications of user input and/or control instructions for controlling another end device (e.g., the dimmer switch 120, the LED driver 130, the plug-in load control device 140, the motorized window treatment 150, and/or the thermostat 160). The remote control device 170 may communicate via one or more intermediary parent devices, such as a leader device and/or a router device, for example. The leader device and/or the router device may communicate with one or more other leader devices and/or router devices in the network to route the messages to the other end device (e.g., the dimmer switch 120, the LED driver 130, the plug-in load control device 140, the motorized window treatment 150, and/or the thermostat 160) for performing load control.

A control device may attach to another control device on a network or network partition (e.g., the network 200 shown in FIG. 2A) to enable the device to communicate (e.g., transmit and/or receive messages) via the network. A control device may initiate attachment to another control device on a network by transmitting a parent request message (e.g., a multicast parent request message) to discover potential parent devices. A parent request message may be transmitted by a control device to discover and/or attach to a parent device (e.g., router devices and/or leader devices). A control device may transmit the parent request message as a multicast message, for example, to identify devices that are attached to a network that can act as a parent device of the control device.

Figure 2B:
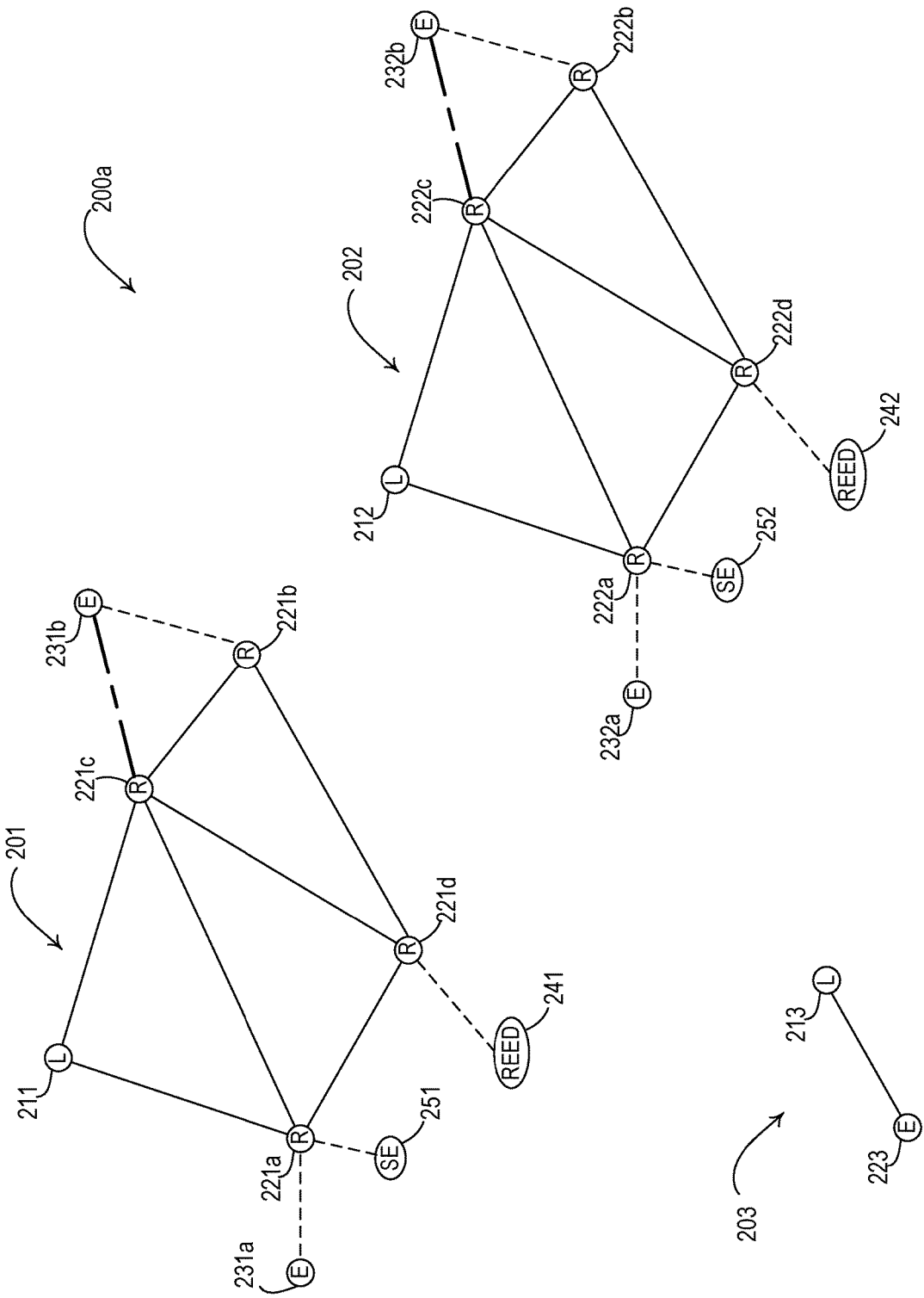
FIG. 2B is a diagram of example networks or network partitions (e.g., networks or subnetworks) that allow for communication between devices in the load control system of FIG. 1.

FIG. 2B is an example illustration of a network 200a having a plurality of network partitions 201, 202, 203 (e.g., separate network partitions). As illustrated in FIG. 2B, the network partition 201 may include the following parent devices: a leader device 211 and router devices 221a, 221b, 221c, 221d. In addition, the network 201 may include child devices, such as: end devices 231a, 231b; router eligible end device 241; and sleepy end device 251. For example, each of the router devices 221a-221d in the network partition 201 may be assigned a unique router identifier. The network partition 202 may include the following parent devices: a leader device 212 and router devices 222a, 222b, 222c, 222d. In addition, the network 202 may include child devices, such as: end devices 232a, 232b; router eligible end device 242; and sleepy end device 252. For example, each of the router devices 222a-222d in the network partition 202 may be assigned a unique router identifier. The network partition 203 may include a single parent device, leader device 213, and a single end device, end device 223.

As illustrated in FIG. 2B, the network partition 203 may include a leader device 213 and an end device 223. The network partition 203, however, may fail to include a router device. Rather, the leader device 213 may function as the sole router device within the network partition 203. A leader device that is not connected or synchronized with a router device may be referred to as a singleton device. For example, the leader device 213 may be a singleton device. As illustrated in FIG. 2B, a singleton device may be connected to one or more child devices (e.g., the end device 223). The network partition 203 may be a singleton partition. As illustrated in FIG. 2B, a singleton partition may include a leader device (e.g., the leader device 213). In addition, a singleton partition may include one or more end devices (e.g., the end device 223). However, as illustrated in FIG. 2B, a singleton partition may not include a router device.

The network 200a may allow for communication between control devices in a load control system (e.g., the load control system 100). In addition, the network partitions 201, 202, 203 may be formed as a result of certain control devices being unable for attach to an already formed network partition. For example, as described herein, a control device may attempt to attach to another control device on a network partition by transmitting a parent request message (e.g., a multicast parent request message). If, however, the control device fails to receive a response to the parent request message (e.g., because the control device is outside of a communication range of the router devices of an already formed network partition), the control device may attempt to form its own network partition (e.g., become a leader device of a new network partition).

A control device that is unable to attach to a network partition may form another network partition. For example, referring to FIG. 2B, the leader device 213 may have been unable to attach to a router device on the network partitions 201, 202 (e.g., because the leader device 213 was outside of communication range of the router devices on the network partitions 201, 202). Accordingly, the leader device 213 may form the network partition 203 and the end device 223 may attach to the network partition 203. Similarly, the leader device 212 may have been unable to attach to the network partitions 201, 203 (e.g., because the leader device 212 is outside of communication range of the router devices of the network partitions 201, 203) and formed the network partition 202.

A network partition may be associated with a partition identifier (e.g., a partition ID). The partition identifier may be randomly or pseudo-randomly assigned (e.g., randomly assigned from a range or list of identifiers). For example, a priority of the respective network partition may be based on the partition identifier for the network partition. The partition identifier may be assigned by randomly selecting a number from a range of partition identifier values. The partition identifier may be selected at a leader device and transmitted in advertisement messages to other devices that may attach to the leader device. Referring now to FIG. 2B, the network partitions 201, 202, 203 may each be associated with a respective partition identifier. For example, the network partition 202 may be assigned a partition identifier of 1, the network partition 203 may be assigned a partition identifier of 2, and the network partition 201 may be assigned a partition identifier of 3. Although the partition identifiers of the network partitions 201, 202, 203 are sequential (e.g., in order to provide for a simplified explanation), the assignment of the partition identifiers to the network partition may be sequential, non-sequential, and/or randomized. As described herein, a partition identifier may also be an indication of a priority of the respective network partition 201, 202, 203. For example, the partition identifier may also be a priority value of the respective network partition 201, 202, 203 (e.g., respective priorities of the network partitions 201, 202, 203 may be 3, 1, and 2). A higher or lower partition identifier may indicate a higher priority value for the network partition priority (e.g., then network partition 201 may be a higher-priority network partition than the network partitions 202, 203 based on the partition identifier).

A priority may be assigned to a respective network partition based on the control devices (e.g., router devices and/or end devices) in the network partition. For example, a network partition having at least one router device in addition to the leader device may be given a higher priority than a network partition having only a leader device and no other router devices. Referring to FIG. 2B, the network partition 201 may be given a higher priority than the network partition 203 since the network partition 201 has router devices 221a-221d and the network partition 203 has no router devices in addition to the leader device. In addition, a priority may be assigned to a respective network partition based on a number of control devices (e.g., router devices and/or end devices) in the network partition. Referring to FIG. 2B, the network partition 201 may be given higher priority than the network partition 203 since the network partition 201 may have a greater number of control devices in the network partition. Each control device in a network partition may have stored locally thereon the number of control devices in the network partition. Network partitions that have the same number of control devices may be given different priorities using different partition identifiers, as described herein. For example, as shown in FIG. 2B, the network partition 201 and the network partition 202 may have the same number of control devices (e.g., router devices and/or end devices). The network partition 201 may have a higher priority based on network partition 201 having a higher or lower partition identifier.

As control devices attach to each of the network partitions 201, 202, 203, the effective communication range of each of the network partitions may increase. In addition, control devices that were initially unable to attach to one or more of the network partitions 201, 202, 203 (e.g., because the control device was previously outside of the communication ranges of all of the network partitions), may subsequently be able to attach to one of the network partitions 201, 202, 203. Moreover, communication within a load control system may be better facilitated when a single network partition is formed (e.g., the network 200 having a single network partition as illustrated in FIG. 2A) as compared to when multiple network partitions are formed (e.g., the network 200a having multiple network partitions 201, 202, 203 as illustrated in FIG. 2B). For example, communication within a load control system may be better facilitated when a single network partition is formed because a device in a network partition may be unable to transmit messages to control devices attached to another network partition (e.g., a device in a network partition may be unable to communicate with other devices outside the network partition). Accordingly, if a control device attached to a first network partition is also within the communication range of a second network partition, the device may attempt to detach from the first network partition and attach to the second network partition. For example, a control device may detach from the first network partition and attach to a second network partition when the priority of the second network partition is higher than the priority of the first network partition.

The router devices attached to each of the network partitions 201, 202 may each be associated with a communication range. The communication range of each of the respective router devices may be pre-defined and/or pre-configured. For example, the communication range of each of the respective router devices may be pre-defined and/or pre-configured based on the hardware components of each of the respective router devices. The effective communication range of a respective network or network partition may be based on the communication range of the router devices attached the respective network (e.g., a summation of the communication range of each of the router devices attached to the respective network). As a result, the communication range of a respective network or network partition may increase as the number of router devices attached to the respective network increases.

As described herein, the control devices attached to a lower-priority network partition may attempt to attach to a higher-priority network partition. For example, the control devices attached to the network partition 202 may attempt to attach to the network partition 201 (e.g., as the network partition 201 has a priority value of 3 and the network partition 202 has a priority value of 1). The router device 222a may receive an advertisement message from a device attached to the network partition 201 (e.g., from the router device 221d). The advertisement message may include an indication of the partition identifier of the network 201 (e.g., 3) may be greater than the partition identifier of the network partition 202 and may indicate that the network partition 201 is a higher-priority network partition than the network 202. The router device 222a may determine to attach to the network partition 201 (e.g., as the network partition 201 has a higher priority).

The router device 222a may attempt to attach to the network partition 201 by transmitting a request to the leader device of the network partition 201 (e.g., the leader device 211). The request may include a request to attach to the network partition 201 as a router device, for example, by requesting to attach to the network partition 201 and be assigned a certain router identifier. For example, the router device 222a may request to attach to the network partition 201 and be assigned the router identifier that the router device 222a is assigned in the network partition 202. In response, the leader device 211 may reject the request if another router device 212a-212d attached to the network partition 201 is already assigned the requested router identifier. The leader device 211 may accept the request if none of the router devices 212a-212d attached to the network partition 201 are assigned the requested router identifier. If the router device 222a attaches to the network partition 201 and is assigned the requested router identifier, the child devices of the router device 222a (e.g., the end device 232a and the sleepy end device 252) may automatically attach to the network partition 201. For example, as the child devices communicate with the router device 222a using the router identifier. If the router device 222a is assigned the requested identifier by the leader device 211 of the network partition 201 (e.g., the router identifier as assigned in the network partition 202), the child devices may continue to communicate with router device 222a using the same router identifier.

Figure 2D:
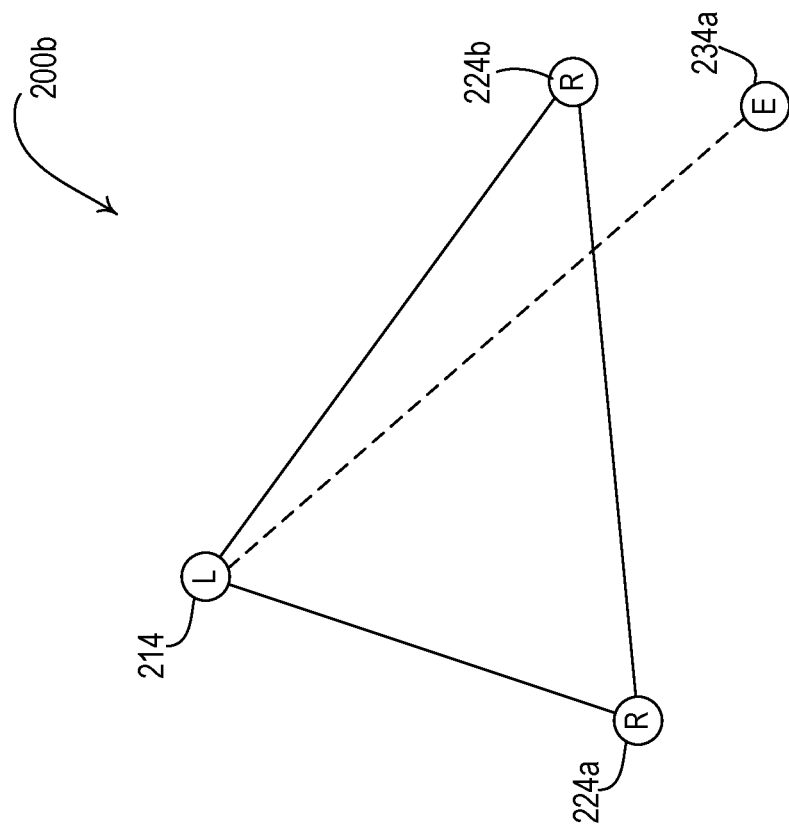
FIGS. 2C and 2D are diagrams of another example network that allows for communication between devices in the load control system of FIG. 1.
Figure 2C:
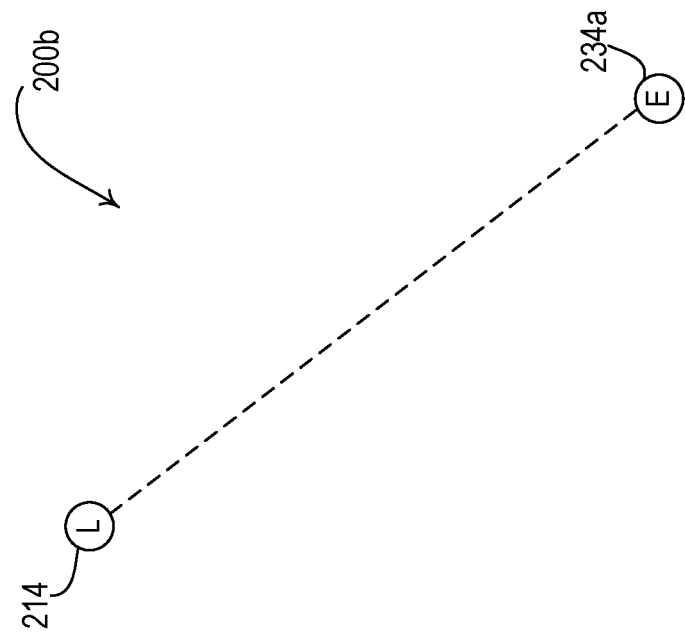

FIGS. 2C and 2D are illustrations of an example network 200b as the network 200b advances or progresses in network formation. As illustrated in FIG. 2C, the network 200b may include a leader device 214 and an end device 234a. As the network 200b is in the initial stages of network formation, the network 200b may not yet include a router device. The end device 234a may, as a result, attach to the leader device 214 (e.g., as other router devices not yet exist on the network 200b). However, the communication link (e.g., the parent/child link) between the leader device 214 and the end device 234a maybe weak (e.g., the received signal strength indicator of messages received by the end device 234a may be approximately −60 dB). For example, the communication link between the leader device 214 and the end device 234a may be weak because the leader device 214 and the end device 234a are not proximately positioned to each other. If the communication link between the leader device 214 and the end device 234a is weak, the likelihood of message transmission and/or reception failures between the leader device 214 and the end device 234a may increase.

FIG. 2D illustrates the network 200b during a later stage of network formation than the stage of network formation illustrated in FIG. 2C. As illustrated in FIG. 2D, the network 200b may grow to include additional control devices as network formation advances (e.g., as time progresses). For example, the network 200b may grow to include router devices 224a, 224b. In addition, the router devices 224a, 224b may be positioned proximate to the end device 234a (e.g., positioned closer to the end device 234a than the leader device 214). In addition, the received signal strength indicators of messages transmitted by the router devices 224a, 224b and received by the end device 234a may be strong (e.g., stronger than the received signal strength indicators transmitted by the leader device 214 and received by the end device 234a, such as −35 dB and −30 dB, respectively). Thus, potential communications links (e.g., potential parent/child links) between the router devices 224a, 224b and the end device 234a may be stronger than the communication link between the leader device 214 and the end device 234a. Moreover, as illustrated in FIG. 2D, a potential communications link between the router device 224b and the end device 234a may be stronger than a potential communications link between the router device 224a and the end device 234a (e.g., as the router device 224b is positioned closer to the end device 234a than the router device 224a).

As network formation progresses or advances additional devices attach to the network. As a result, the end device 234a may experience better communication over the network 200b if the end device 234a determines to detach from an initial parent device (e.g., the leader device 214) and to attach to an updated parent device (e.g., the router device 224a or the router device 224b). For example, as described herein, the updated parent device may be positioned closer to the end device 234a than the initial parent device (e.g., such that the updated parent device and the end device 234a may have a stronger communication link), which may increase the likelihood that message transmission and/or receptions are successful. As a result, as network formation advances, the end device may determine whether to attach to an updated parent device. Although FIGS. 2C and 2D are described using an example where the relative positioning of devices may increase or decrease the communications link shared between two devices, other conditions may affect the communication link shared between two devices (e.g., line of sight, interference, signal obstructions, etc.). To that extent, the scenarios of FIGS. 2C and 2D are merely examples to illustrate that a network may change of over time and that changes to network may be considered in attempts to increase communications over the network.

Figure 2E:
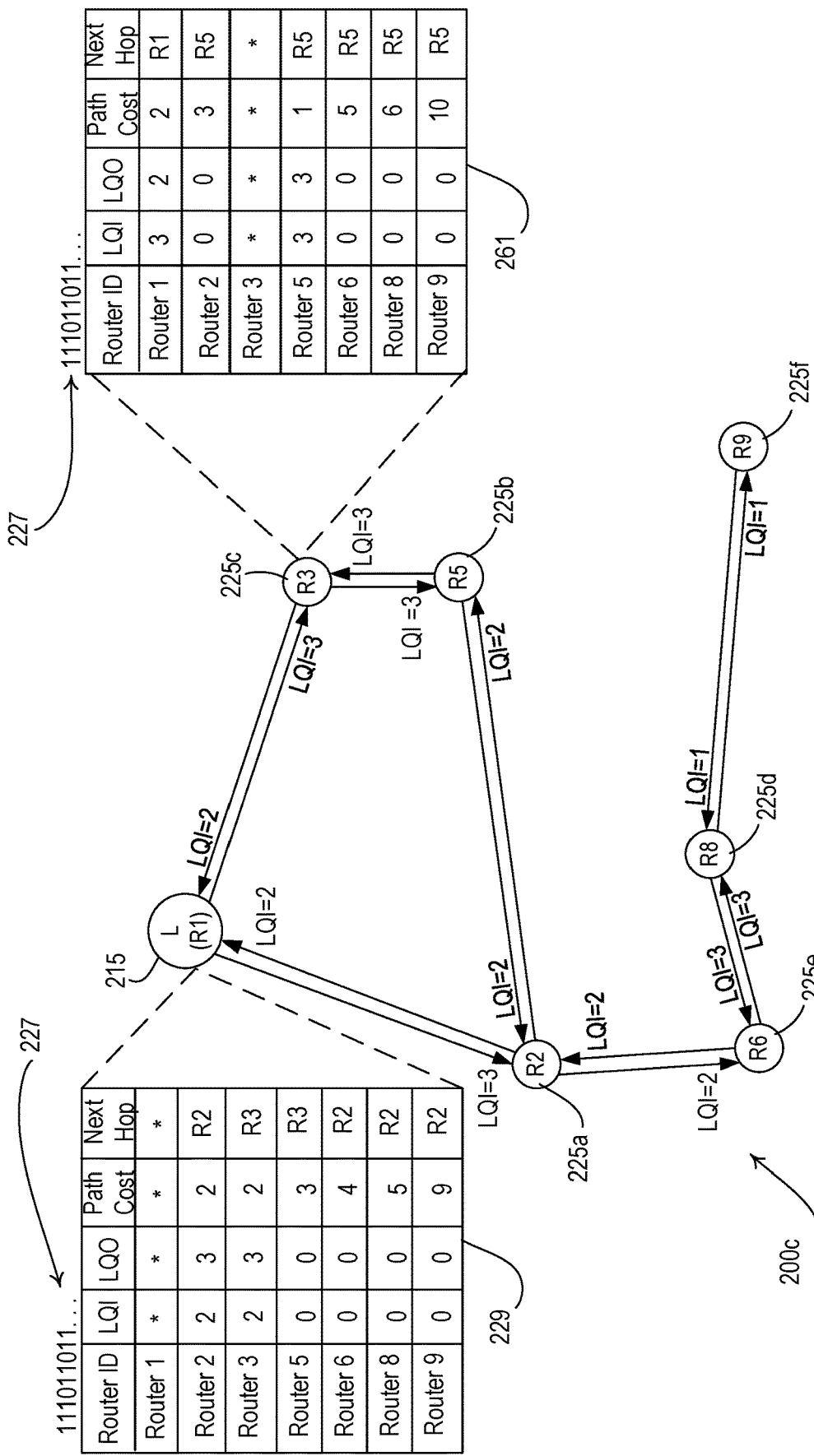
FIG. 2E is a diagram of another example network that illustrates the cost and network overhead associated with communication between the devices in the load control system of FIG. 1.

FIG. 2E is an illustration of an example network 200c. As illustrated in FIG. 2E, the network 200c may include a leader device 215 and router devices 225a, 225b, 225c, 225d, 225e, 225f. In the network 200c, the router devices (e.g., leader device 215 and router devices 225a, 225b, 225c, 225d, 225e, 225f) may periodically transmit advertisement messages that may be used for calculating cost and/or quality of communications in the network 200c. For example, router device 225c may send an advertisement message that is received by leader device 215 and leader device 215 may send an advertisement message that is received by router device 225c. Each router device may measure the received signal strength indicator (RSSI) of the received advertisement message and calculate a link quality at which the advertisement message is received (e.g., link quality in (LQI)).

Each router device (e.g., leader device 215 and router devices 225a, 225b, 225c, 225d, 225e, 225f) may send an advertisement message as a multicast message. The advertisement messages transmitted by a router device may be received by neighboring router devices that share a single-hop communication link with the router device transmitting the advertisement messages. A single-hop communication link may be capable of communicating messages (e.g., messages) from a router device via a unicast and/or multicast communication directly to another router device. For example, the router devices 225a, 225c may be neighboring devices that share a single-hop communication link with the leader device 215, as the router devices 225a, 225c are capable of sending messages directly to and/or receiving messages directly from the leader device 215. The single-hop communication link may be a communication link on which router devices may be capable of directly receiving the advertisement messages above a given link quality (e.g., LQI greater than 0).

After a router device receives a periodic advertisement message from another router device, the router device may calculate the link quality (e.g., LQI) of the communication link via which the advertisement message is received. The LQI may be calculated as a predefined number that is within a range indicating different link qualities for the communication link between two devices. For example, the LQI may be indicated by values of 0, 1, 2, or 3. The different indicators of LQI may be assigned based on the RSSI of the received advertisement message and a link margin relative to a predefined receive level. The receive level may be a predefined minimum receive level. The receive level may be established as a predefined RSSI value for communications on the network. For example, the receive level may be defined by a noise floor that is set to an average RSSI value for noise generated on the network over a period of time. In an example using the receive level as a noise floor, a router device (e.g., leader device 215 or router device 225c) may calculate an LQI of 1 for communications received on a link from a neighboring router device when the RSSI value of one or more advertisement messages (e.g., average RSSI for advertisement messages over a period of time) is at least a link margin of 2 dB above the noise floor. The router device (e.g., leader device 215 or router device 225c) may calculate a link quality of 2 for communications received on a link with a neighboring router device when the RSSI value of one or more advertisement messages (e.g., average RSSI for advertisement messages over a period of time) is at least a link margin of 10 dB above the noise floor. The router device (e.g., leader device 215 or router device 225c) may calculate a link quality of 3 for communications received on a link with a neighboring router device when the RSSI value of one or more advertisement messages (e.g., average RSSI for advertisement messages over a period of time) is at least a link margin of 20 dB above the noise floor. A link quality value of zero may indicate that the link quality is unknown or infinite when the RSSI value of one or more advertisement messages (e.g., average RSSI value for advertisement messages over a period of time) is unable to be determined above the noise floor. Though examples are provided for predefined numbers indicating different levels of link quality, and/or different link margins that may be assigned to those levels, other indicators and/or values may be used to define link quality between two routing devices. Additionally, though individual routing devices may be provided as an example (e.g., leader device 215 or router device 225c), other routing devices may similarly calculate link quality for communication links between neighboring routing devices.

The LQI of the communication links measured locally at each control device (e.g., the leader device 215 and the router device 225c) may be exchanged with the other device on the communication link. For example, the LQI may be measured locally at each control device and transmitted to the other device via an advertisement message. The LQI that is measured by another router device (e.g., on the other side of the communication link) and received at a router device may be stored as the link quality out (LQO) for the communication link. The LQI and/or the LQO may be stored in a local router table at each routing device. For example, the leader device 215 may store the LQI and/or the LQO for the communication link with each router device in the network 200c in a router table 229. Similarly, the router device 225c may store the LQI and the LQO for communicating with each router device in the network 200c in a router table 261.

As described herein, the router tables 229, 261 may each identify network information for communicating with each router in the network 200c from the perspective of the devices at which the router tables 229, 261 are stored. The number of router devices in the network 200c and/or the router identifiers in use in the network 200c may be determined from a bitmap 227, as described herein. The bitmap 227 may be maintained by the leader device 215 and distributed to the other routing devices for locally maintaining their router tables. For example, the router devices 225a, 225c may receive the bitmap 227 and update their local router tables. The bitmap 227 may indicate the number of rows in the router tables (e.g., indicating the number of identified router devices in the network) and/or the router identifiers to include in the router tables. The router devices may maintain updated network information for the indicated router identifiers in the router tables. The updated network information in the router tables may include the LQI and/or LQO for the communication link between the router devices identified in the bitmap 227. For example, the router 225c may receive the bitmap 227 from the leader device 215 and update the router table 261 to include router devices in the table 261 that are indicated in the bitmap 277, or remove router devices in the table 261 that are indicated in the bitmap 277 as failing to be used in the network.

The leader device 215 and router devices 225a, 225b, 225c, 225d, 225e, 225f may each use the LQI and LQO in their respective router tables to calculate a link cost for communicating on a communication link with other router devices. The link quality for the communication link between the two router devices may be the lesser of the value of the link quality for messages being transmitted out (e.g., LQO) and the value of the link quality for messages being received (e.g., LQI) on a single-hop communication link between two devices. An LQO or an LQI of zero may indicate that the router device fails to have a direct communication link with the router device listed in the router table.

A link cost for sending communications between devices on a communication link may correspond directly to the link quality of communications on the communication link. The link cost may indicate a relative cost or loss of communications on the communication link. FIG. 2F is an example table 262 that illustrates example link costs that may correspond to different link qualities.

As shown in FIG. 2F, a greater link quality may correspond to a lower link cost for communications on the communication link between two neighboring devices.

The link cost for each communication link may be used by a router device to calculate a path cost for communications between the router device and another router device in the network 200c. The path cost may indicate the relative cost or loss of communications on an entire communication path that may include one or more router devices. The path cost for one communication path may be compared to another to determine a higher quality communication path for sending digital communications that may have a lower relative cost associated with transmission of messages.

The path cost may indicate the overall cost for communicating a message from a starting router device to an ending router device. For example, the path cost may be calculated as the total of the link costs for each hop between the starting router device from which a message may originate and the ending router device at which the message may be received in the network 200c. Each router device may calculate the path cost to a neighboring device on a single-hop communication link as being equal to the link cost and store the path cost in the locally-stored router table. For example, the router device 225c may set the path cost for communications with the leader device 215 equal to the link cost (e.g., lower of LQI and LQO) on the communication link and store the path cost in the router table 261. Similarly, the router device 225c may set the path cost for communications with the router device 225b equal to the link cost (e.g., lower of LQI and LQO) on communication link and store the path cost in the router table.

Each router device (e.g., leader device 215 and router devices 225a, 225b, 225c, 225d, 225e, 225f) may update the path cost for communicating messages to/from each router device in their respective router table based on the path cost information received from another router device. For example, as the router device 225b may be unable to directly communicate with the leader device 215, the router device 225b may receive path cost information for communicating messages through another router in the network 200c. The router 225c may transmit the path cost for communicating messages to/from the leader device 215 (e.g., path cost=2) in a multicast message that is received by other router devices. The multicast message may be an advertisement message, for example. The router device 225b may receive the path cost for communicating messages between the leader device 215 and the router device 225c (e.g., path cost=2). To calculate the total path cost for communicating messages between the router device 225b and the leader device 215 through the router device 225c, the router device 225b may add the link cost for communications between the router device 225b and the router device 225c (e.g., link cost=1) to the path cost received from the router device 225c (e.g., path cost=1) to get a total path cost (e.g., path cost=3). The link cost for communications between the router device 225b and the router device 225c may be determined from the link quality of the communication link between the router device 225b and the router device 225c, which may be the smaller of the LQI and LQO of the communication link (e.g., link quality=3).

Each router device may send/broadcast an advertisement message that includes the path cost to one or more other router devices in the network 200c. The router devices that receive the path cost information from the router device that sent the advertisement message may update their respective path cost information in their local router tables (e.g., by adding their link cost for communications with the router device that sent the advertisement message to the path cost in the received message). Each router device may use the locally-stored path cost information to identify the path through with messages may be communicated. For example, messages transmitted from the router device 225b to the leader device 215 may be communicated through the router device 225a or the router device 225c. The router device 225b may receive respective advertisement messages from the router device 225a and the router device 225c that indicate the path cost for communication of messages between the router device 225a and the leader device 215 is the same as the path cost for communication of messages between the router device 225c and the leader device 215 (e.g., path cost=2 on each communication link). The router device 225b may add the link cost calculated for communicating messages between the router device 225b and the router device 225c (e.g., link cost=1) to the path cost information received in the advertisement message from the router 225c (e.g., path cost=2) to determine the total path cost for communicating with the leader device 215 through the router device 225c (e.g., total path cost=3). The router device 225b may similarly add the link cost calculated for communicating messages between the router 225b and the router 225a (e.g., link cost=2) to the path cost information received in the advertisement message from the router 225a (e.g., path cost=2) to determine the total path cost for communicating with the leader device 215 through the router device 225a (e.g., total path cost=4). The router device 225b may update a locally-stored router table with the lowest calculated path cost for communicating with the leader device 215 and/or the identifier of the router device through which messages are to be transmitted (e.g., router 225c). Each router device may similarly update their respective locally-stored router table with the lowest calculated path cost for communicating with the other router devices in the network 200c. For example, as shown in FIG. 2E, the leader device 215 and the router device 225c may each calculate the lowest path cost for communicating to other router devices in the network 200c and store the path cost in the respective router tables 229, 261. The router tables 229, 261 may also have stored therein the router identifier of the next hop from the respective devices 215, 225c through which messages are to be communicated to achieve the calculated path cost for communications to the destination router device.

Through periodically updating the link quality (e.g., LQI and/or LQO), link cost, and/or path cost, and communicating the path cost to other router devices in periodic advertisement messages, each router device may have up-to-date path cost information for communicating messages to other router devices in the network 200c. The router device may use the best communication path (e.g., lowest cost path) for communicating messages to another device. This routing mechanism may allow router devices to detect when other router devices have dropped off the network 200c, or a path cost between routers has changed, and calculate the next lowest cost path to maintain connectivity to other router devices in the network 200c.

In an effort to distinguish relatively older data being transmitted in the periodic advertisement messages from relatively newer data transmitted in the periodic advertisement messages, the advertisement messages may be communicated with a sequence number. The leader device, such as leader device 215, may be responsible for updating the sequence number and distributing the updated sequence number to the other router devices in the network (e.g., router devices 225a, 225b, 225c, 225d, 225e, 225f in network 200c). For example, the leader device 215 may increment the sequence number periodically (e.g., after transmission of one or more advertisement messages) and/or after a router device is added to the network. The sequence number may be updated to allow router devices in the network (e.g., leader device 215 and/or router devices 225a, 225b, 225c, 225d, 225e, 225f in network 200c) to identify updated network information transmitted in advertisement messages. For example, as router devices (e.g., leader device 215 and/or router devices 225a, 225b, 225c, 225d, 225e, 225f in network 200c) may be periodically communicating advertisement messages that include path cost information that indicates the path cost for communicating with other router devices in the network, the sequence number may be updated to identify the updated path cost information.

After the leader device 215 updates the sequence number, the leader device 215 may distribute the sequence number to other router devices in the network. For example, the leader device 215 may use the sequence number in its own advertisement messages. After receiving the updated sequence number, each router device may use the updated sequence number for subsequent advertisement messages transmitted from the router device on the network. Each sequence number transmitted from the leader device 215 to the other router devices may be used in the advertisement messages for the router devices until a subsequent sequence number is distributed by the leader device 215. For example, the router device 225c may receive the sequence number directly from the leader device 215 and use the sequence number in subsequent advertisement messages. The router device 225b may receive the sequence number in the advertisement messages transmitted from the router device 225c and use the sequence number in subsequent advertisement messages transmitted from the router device 225b. The routers may each use the current sequence number until an updated sequence number is received that is originated at and distributed from the leader device 215. Each router device may update the locally-stored network information in the router table when the router device receives an advertisement message from a non-leader router device (e.g., router devices 225a, 225b, 225c, 225d, 225e, 225f) that has an updated sequence number. If a router device receives an advertisement message that has the same sequence number as a previously received advertisement message, and/or previously received from the same non-leader router device, the router device may fail to process the advertisement message. If a router device fails to receive an updated sequence number within a predefined period of time (e.g., minutes, seconds, etc.), the router may assume the leader device 215 is unavailable for communications (e.g., offline, powered off, dropped from the network, changed roles, or is otherwise unable to communicate with the router device) and attempt to form another network or network partition having another leader device 215.

Figure 3A:
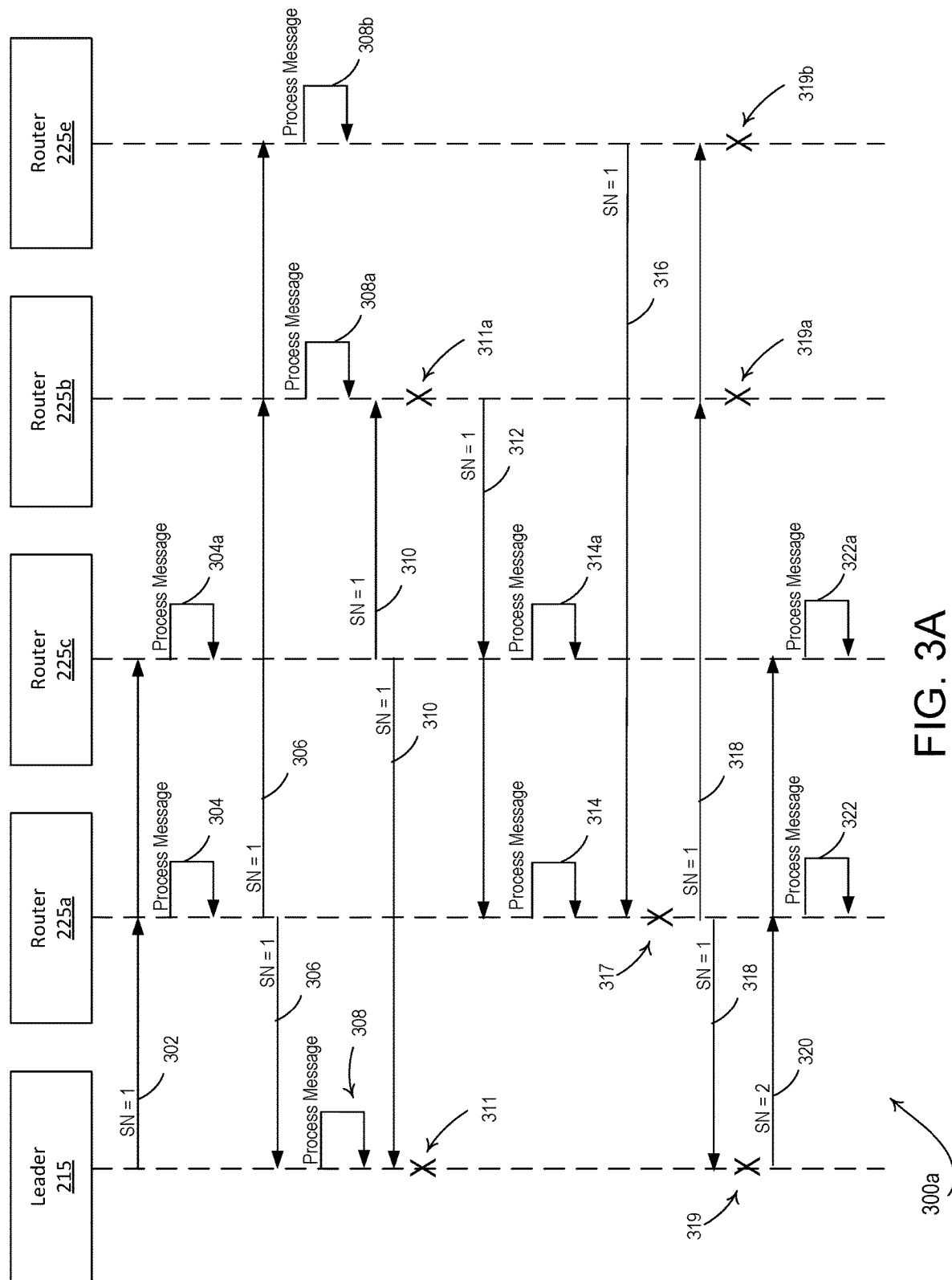
FIGS. 3A and 3B are sequence flow diagrams illustrating example advertisement messages communicated between devices in a network.
Figure 3B:
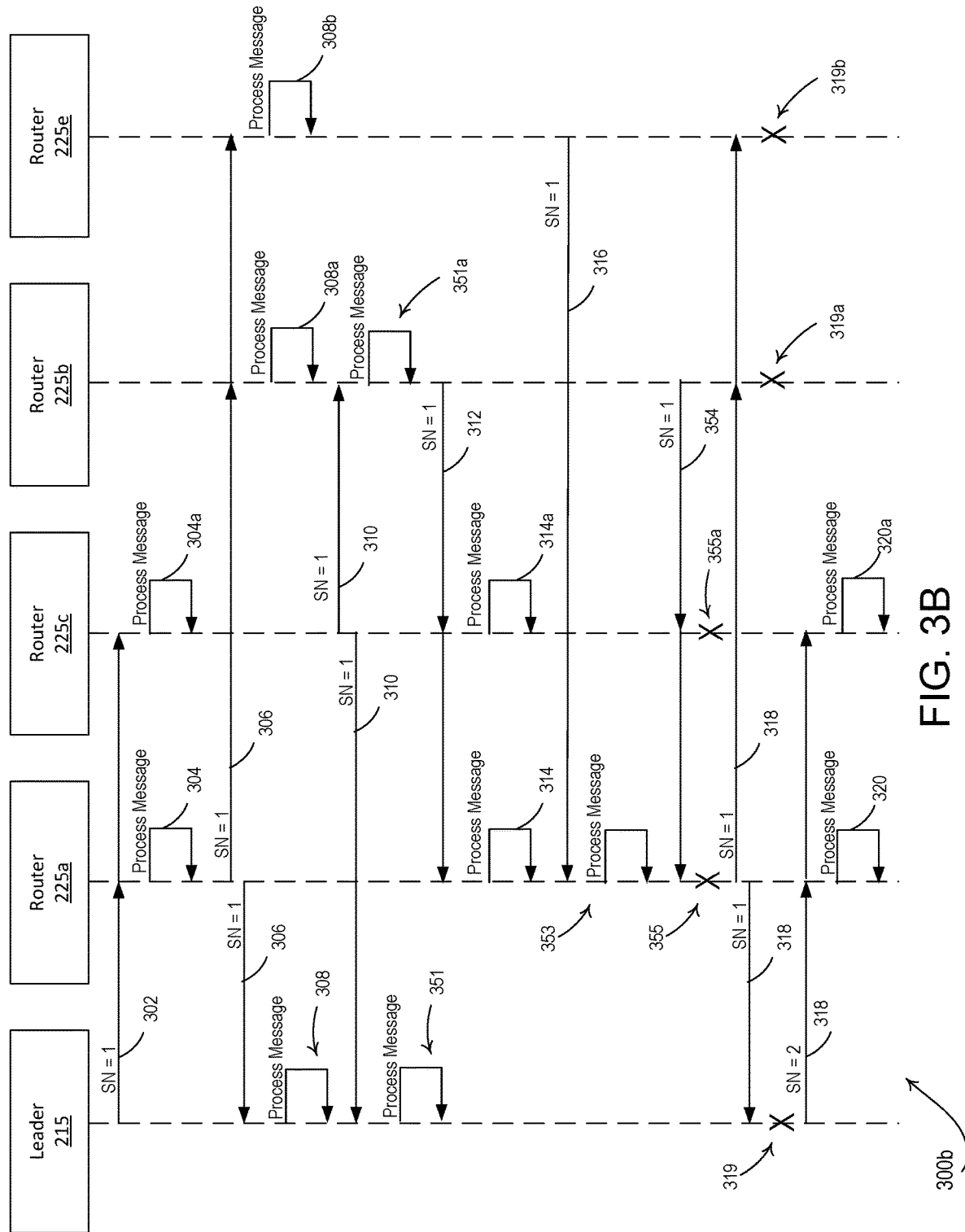

FIGS. 3A and 3B are illustrations of sequence flow diagrams illustrating example advertisement messages communicated between devices in networks 300a, 300b, respectively, using sequence numbers to process the advertisement messages. The example networks 300a, 300b each include a subset of the devices in the network 200c shown in FIG. 2E as an example, though other networks having other configurations may operate similarly. For example, the networks 300a, 300b include the leader device 215 and router devices 225a, 225b, 225c, and 225e. As shown in FIG. 2E, router device 225a and router device 225c may each share a single-hop communication link with the leader device 215. Router 225b may share a single-hop communication link with each of the router device 225a and the router device 225c. The router device 225e may share a single-hop communication link with the router device 225a.

In the example network 300a, as illustrated in FIG. 3A, the leader device 215 and the other router devices 225a, 225b, 225c, and 225e may process advertisement messages based on a sequence number. As shown in FIG. 3A, the leader device 215 may generate the sequence number that is used in advertisement messages transmitted by other router devices. As described herein, the leader device 215 may generate a sequence number and update the sequence number for being used in advertisement messages in the network 300a to distinguish data being transmitted by router devices in the network. For example, the sequence number may be incremented periodically (e.g., after transmission of one or more advertisement messages) by the leader device 215 and/or after a router device is added to the network to allow router devices in the network (e.g., leader device 215 and/or router devices 225a, 225b, 225c, 225e in network 300a) to identify updated network information transmitted in advertisement messages. The updated network information may include updated link quality information (e.g., LQI and/or LQO) and/or path cost information that indicates the path cost for communicating with other router devices in the network 300a.

The leader device 215 may use the sequence number in an advertisement message 302 transmitted from the leader device 215. The advertisement message 302 may be received by router device 225a and 225c that each share a single-hop communication link with the leader device 215. The router device 225a and router device 225c may each process the advertisement message 302 at 304 and 304a, respectively. The router devices 225a, 225c may each identify the advertisement message 302 as including an updated sequence number (e.g., sequence number=1) from the leader device 215. The router devices 225a, 225c may update their locally-used sequence number to reflect the sequence number received from the leader device 215.

The router devices 225a, 225c may use the sequence number from the leader device 215 in their own advertisement messages. The router devices 225a, 225c may each also process another advertisement message that is subsequently received from another non-leader router device (e.g., a router device other than the leader 215). The router devices 225a, 225c may identify the sequence number as being received in an advertisement message from the leader device 215 and allow processing of another advertisement message received from another non-leader router device.

Each of the router devices 225a, 225c may periodically transmit their own advertisement messages to "upstream routers" toward the leader device 215 and/or "downstream routers" from the leader device 215 using the sequence number received from the leader device 215. The advertisement messages from each router device may be transmitted randomly within a predefined period of time. As shown in FIG. 3A, router device 225a may transmit an advertisement message 306 as a multicast message. The advertisement message 306 may be received by the leader device 215, the router device 225b, and/or the router device 225e. The leader device 215 and/or the router devices 225b, 225e may each share a single-hop communication link with the router device 225a. The leader device 215 may identify the sequence number in the advertisement message 306 (e.g., sequence number=1). As the leader device 215 has yet to process an advertisement message from a non-leader router device that includes the identified sequence number, the leader device 215 may process the advertisement message 306 at 308. As the leader device 215 may be the single leader device in the network, each advertisement message received by the leader device 215 may be received from a non-leader router device. The router devices 225b, 225e may each identify the sequence number in the advertisement message 306 (e.g., sequence number=1). As each of the router devices 225b, 225e has yet to process an advertisement message from a non-leader router device that includes the identified sequence number (e.g., sequence number=1), the router devices 225b, 225e may each process the advertisement message 306 at 308a and 308b, respectively. The processing of the advertisement message 306 may include identifying updated network information. For example, the processing of the advertisement message 306 may include identifying updated link quality information (e.g., LQI and/or LQO) and/or path cost information in the advertisement message 306, which may result in updates to the network information in the locally-stored router table at the router devices 225b, 225e to improve network communications.

After receipt of the advertisement message 306 at the router devices 225b, 225e, the router devices 225b, 225e may identify the updated sequence number being used in the advertisement message 306. The router devices 225b, 225e may each store the updated sequence number for use in their own advertisement messages. Each of the router devices 225b, 225e may periodically transmit their own advertisement messages using the sequence number. The sequence number may be used by the router devices 225b, 225e in advertisement messages sent to "downstream routers" (not shown) and/or "upstream routers" (e.g., leader device 215, router device 225a, router device 225c) in the network 300a.

As shown in FIG. 3A, router device 225c may transmit an advertisement message 310. The advertisement message 310 may be transmitted after a random time period as a multicast message. The advertisement message 310 may be received by the leader device 215 and the router device 225b. The leader device 215 and/or the router device 225b may each share a single-hop communication link with the router device 225c. The leader device 215 may identify the sequence number in the advertisement message 310 (e.g., sequence number=1). As the leader device 215 has already processed an advertisement message from a non-leader router device that includes the identified sequence number (e.g., the advertisement message 306 processed at 308), the leader device 215 may fail to process the advertisement message 310 at 311. For example, the leader device 215 may ignore and/or discard the advertisement message 310 at 311. The router device 225b may similarly identify the sequence number in the advertisement message 310 (e.g., sequence number=1). As the router device 225b has already processed an advertisement message from a non-leader router device that includes the identified sequence number (e.g., the advertisement message 306 processed at 308a), the router device 225b may fail to process the advertisement message 310 at 311a. For example, the router device 225b may ignore and/or discard the advertisement message 310 at 311a. The failure of the leader device 215 and/or the router device 225b to process the advertisement message 310 from the router device 225c may save on local memory and/or processing resources. However, failure to process the advertisement message 310 may result in the leader device 215 and/or the router device 225b failing to process the network information in the advertisement message 310. For example, the leader device 215 and/or the router device 225b may fail to identify updated link quality information (e.g., LQI and/or LQO) and/or path cost information in the advertisement message 310, which may result in a failure to update the locally-stored router table at the leader device 215 and/or the router device 225b to improve network communications.

The router device 225b may periodically transmit advertisement messages using the sequence number identified in the advertisement message 306. The router device 225b may transmit an advertisement message 312 as a multicast message. The advertisement message 312 may be received by the router device 225a and/or the router device 225c. The router device 225a and the router device 225c may each share a single-hop communication link with the router device 225b. The router device 225a and the router device 225c may each identify the sequence number in the advertisement message 312 (e.g., sequence number=1). As the router device 225a has yet to process an advertisement message from a non-leader router device that includes the identified sequence number, the router device 225a may process the advertisement message 312 at 314. Similarly, as the router device 225c has yet to process an advertisement message from a non-leader router device that includes the identified sequence number, the router device 225c may process the advertisement message 312 at 314a. The processing of the advertisement message 312 may include identifying updated network information. For example, the processing of the advertisement message 312 may include identifying updated link quality information (e.g., LQI and/or LQO) and/or path cost information in the advertisement message 312, which may result in updates to the network information in the locally-stored router table at each device (e.g., the router device 225a and the router device 225c).

As shown in FIG. 3A, router device 225e may transmit an advertisement message 316. The advertisement message 316 may be transmitted after a random time period as a multicast message. The advertisement message 316 may be received by the router device 225a. The router device 225a may each share a single-hop communication link with the router device 225e. The router device 225a may identify the sequence number in the advertisement message 316 (e.g., sequence number=1). As the router device 225a has already processed an advertisement message from a non-leader router device that includes the identified sequence number (e.g., the advertisement message 312 processed at 314), the router device 225a may fail to process the advertisement message 316 at 317. For example, the router device 225a may ignore and/or discard the advertisement message 316 at 317. The failure of the router device 225a to process the advertisement message 316 from the router device 225e may save on local memory and/or processing resources. However, failure to process the advertisement message 316 may result in the router device 225a failing to process the network information in the advertisement message 316. For example, the router device 225a may fail to identify updated path cost information in the advertisement message 310, which may result in a failure to update the locally-stored router table at the router device 225a to improve network communications.

Additionally, as the router device 225a is the router device in the path that allows the router 225e to communicate with the leader device 215, the leader device also fails to receive the updated network information in the advertisement message 316. For example, the router device 225a may transmit an advertisement message 318 after failing to process the advertisement message 316 at 317. The advertisement message 318 may fail to include the updated network information based on the network information in the advertisement message 316. Additionally, as the advertisement message 318 includes the same sequence number (e.g., sequence number=1) as an advertisement message previously received from a non-leader router device at leader device 215 and router devices 225b, 225e, the leader device 215 and the router devices 225b, 225e may fail to process the advertisement message 318 at 319, 319a, and 319b, respectively. As such, the updated network information fails to be transmitted to and/or received by the leader device 215 for updating the network information stored locally thereon for improving network communication.

The leader device 215 may transmit another advertisement message 320 (e.g., periodically or after a router device is added to the network 300a). The advertisement message 320 may include an updated sequence number (e.g., sequence number=2). The advertisement message 320 may be received by router device 225a and router device 225c that each share a single-hop communication link with the leader device 215. The router device 225a and router device 225c may each process the advertisement message 320 at 322 and 322a, respectively. The router devices 225a, 225c may each identify the advertisement message 320 as including an updated sequence number (e.g., sequence number=2) from the leader device 215 and may update their locally-used sequence number to reflect the sequence number received from the leader device 215. The router devices 225a, 225c may use the updated sequence number from the leader device 215 in their own subsequent advertisement messages. The router devices in the network 300a may each continue to process an advertisement message that is received from a non-leader router device (e.g., a router device other than the leader 215), as described herein.

When router devices process advertisement messages from other router devices as illustrated in the network 300a, router devices may be competing with each other for using a given sequence number in an advertisement message to have their advertisement message and the network information therein processed by other router devices. The router devices may be competing for use of a given sequence number in their router messages, because once a router device receives an advertisement message with the sequence number from a non-leader router device it may fail to process the next advertisement message with the same sequence number. A router device may lose to another competing router device when its network information fails to be propagated through the network because their advertisement message with a particular sequence number happens to be transmitted/received after an advertisement message of another router device having the same sequence number. Router devices that each share a single-hop communication link with a common router device may be directly competing for an earlier use of a given sequence number. For example, router 225a and 225c may be competing to have advertisement messages processed by the leader device 215; and the router devices 225b and 225e may be competing to have advertisement messages processed by the router device 225a. A router device may also be multiple hops from another router device in the network, which may result in multiple router devices competing to use sequence numbers to communicate advertisement messages to share updated network information (e.g., link quality information and/or path cost information) with upstream router devices. For example, in order for the router device 225e to be able to share updated network information with leader device 215, the router device 225e may compete with router 225b for an earlier use of a sequence number in an advertisement message transmitted to router device 225a, and then router device 225a may compete with router 225c for an earlier use of a sequence number in an advertisement message transmitted to leader device 215.

The router devices that are closer to the leader device 215 (e.g., router devices that are a fewer number of hops from the leader device 215) may have the opportunity to receive and use the updated sequence numbers provided by the leader device 215 before the router devices that are further from the leader device 215 (e.g., router devices that are a greater number of hops from the leader device 215). This may result in the router devices that are closer to the leader device 215 having their advertisement messages processed more frequently by other router devices than router devices that are further from the leader device 215. For example, the router devices 225a, 225c may receive the updated sequence numbers before the router devices 225b, 225e, which may result in the router devices 225a, 225c having a greater chance of using the updated sequence numbers before the router devices 225b, 225e. This means that router devices 225a, 225c may have a greater chance of having their network information propagated to other router devices in the network than router devices 225b, 225e.

Though the network 300a is shown as an example, the competition for use of the sequence number may increase as the network grows. As a router device's single-hop communication links to other router devices increases, the competition for the use of the sequence number increases. For example, in a network with a router device having a single-hop communication link to 16 other routers, each of the 16 router devices transmitting periodic advertisement messages back to the one router may have 1-in-15 chance of being an advertisement that the one router device processes.

The link quality on a given communication link may affect a router device's ability to send/receive advertisement messages having the updated sequence number. For example, the link quality on the communication link between the router device 225a and the leader device 215 may be worse than the link quality on the communication link between router device 225c and the leader device 215. As a result, the router device 225a may receive an advertisement message with an updated sequence number later than the router device 225c (e.g., due to packet loss) and may begin using the updated sequence number in its own advertisement messages later. Due to similar link quality differences, an advertisement message that is sent from the router device 225a and includes a given sequence number may be received at the leader device 215 later than an advertisement message that is sent from the router device 225c and includes the same sequence number, even though the router device 225a may have begun using the sequence number in advertisement messages earlier.

Router devices being unable to communicate updated network information may delay or prevent improvements in link quality for incoming communications to a router device and/or children of the router device. A router device may be able to update network information stored locally thereon to improve the path cost for communications being sent out on the network, but the router device may be unable to transmit the updated network information out to other router devices which may result in the path cost failing to be improved, or the improvement being delayed, for incoming communications from other router devices. The router devices that have a lower link quality and/or greater path cost for network communications may be the router devices that would benefit greater from other router devices (e.g., "upstream" router devices) updating locally-stored network information to enable an updated path for communications to the router device on the network. A degraded link quality for a communication link may be caused by long-term interference, or shorter-term interference (e.g., spikes of increased noise on the network, such as streaming multimedia or other data over the network). Degraded link quality caused by long-term interference may eventually be resolved by an updated path for network communications, but degraded link quality caused by short-term interference may be more difficult to address due to the inability of a router device to identify the shorter-term changes in the link quality.

The router devices failing to be able to communicate updated network information to the leader device 215 may result in the leader device 215 failing to update the bitmap on which each of the router devices bases its locally-stored router table. As described herein, the leader device 215 may be the device responsible for updating the bitmap indicating the number of router devices in the network and/or the router identifier for each of the router devices in the network. The router devices in the network may maintain the link quality information and/or path cost information for each of the router devices indicated in the bitmap. An indication of a link quality or path cost below a given threshold (e.g., a poor link quality of 0 or 1) may be an implicit request to the leader device 215 to downgrade a router device's role, or that the router device has left the network, and allow the leader device 215 to update the bitmap for being distributed to the other router devices. For example, due to a delay in receiving updated link quality information for a communication link between router devices, the leader device 215 may delay the downgrading (e.g., to an end device) of a router device (e.g., to allow for children of the router device to attach to another router, to free up a router identifier in the bitmap for another device to be upgraded, etc.) or identification of a router device having left the network (e.g., been unplugged, battery dies, or otherwise powers down). Without an updated bitmap, the router devices may each maintain the network information for each router device, which may unnecessarily occupy resources on the router devices. Without the updated bitmap, other devices in the network may be prevented from being upgraded to a router device role to improve network communications.

In the example network 300b as illustrated in FIG. 3B, the leader device 215 and the other router devices 225a, 225b, 225c, and 225e may process advertisement messages based on a sequence number and a device identifier. For example, the leader device 215 and the other router devices 225a, 225b, 225c, and 225e may each receive an advertisement and identify both the sequence number and the router identifier or another unique identifier of the router device to determine whether a prior advertisement message has been received from the same router device with the same sequence number. Advertisement messages that are received with the same sequence number and router identifier as a previously-received advertisement message may fail to be processed (e.g., ignored and/or discarded).

The sequence flow in FIG. 3B includes the same advertisement messages 302, 306, 310, 316, 318 transmitted to/from the same router devices as illustrated in FIG. 3A. However, in the network 300b additional advertisement messages may be processed. For example, the leader device 215 and the router device 225b may each receive the advertisement message 310 and identify the sequence number and router identifier (e.g., or other unique identifier of the router device 225c) in the advertisement message 310. The leader device 215 and the router device 225b may each compare the sequence number and router identifier in the advertisement message 310 to information stored from previously received advertisement messages. As shown in FIG. 3B, the leader device 215 and the router device 225b may each process the advertisement message 310 at 351 and 351a, respectively. Though the leader device 215 and the router device 225b may have each previously received the advertisement message 306 with the same sequence number as the sequence number in the advertisement message 310 (e.g., sequence number=1), the advertisement message 310 may be processed as the advertisement message 306 was received from another non-leader router device (e.g., router device 225a). Similarly, the router device 225a may receive the advertisement message 316 and compare the sequence number and router identifier in the advertisement message 316 to information stored from previously received advertisement messages. As shown in FIG. 3B, the router device 225a may process the advertisement message 316 at 353. The ability for the router devices (e.g., leader device 215 and router devices 225a, 225b, 225c, 225e) to each have an advertisement message processed that uses the sequence identifier may allow for updated network information (e.g., link quality information and/or path cost information) to be identified by other router devices to improve network communications.

Router devices that identify an advertisement message as having the same sequence number and router identifier (e.g., or other unique identifier of the router device 225c) as a previously-received advertisement message from a non-leader router device may fail to process the advertisement message. As shown in FIG. 3B, router device 225a and router device 225c may each receive advertisement message 354 that is transmitted from router device 225b. The advertisement message 354 may include the same sequence number (e.g., sequence number=1) as the advertisement message 312 that was previously transmitted from the router device 225b. The router device 225a and the router device 225c may each identify the sequence number and the router identifier (e.g., or other unique identifier of router device 225c) as being the same as the sequence number and router identifier received in the advertisement message 312 and fail to process the advertisement message 354 at 355 and 355a, respectively. As the router device 225a and the router device 225c have each already processed an advertisement message from the same non-leader router device that includes the same identified sequence number, the advertisement message 354 may fail to be processed. For example, the router device 225a and the router device 225c may each ignore and/or discard the advertisement message 354 at 355 and 355a, respectively. The failure of the router device 225a and the router device 225c each to process the advertisement message 354 may save on local memory and/or processing resources.

As shown in FIG. 3B, the leader device 215 and/or router devices 225a, 225b, 225c, 225e may perform additional processing of advertisement messages by processing multiple advertisement messages that have the same sequence number. The processing of advertisement messages may be limited by processing an advertisement message having the same sequence number from each non-leader router device in the network 300b. This additional processing may allow for the propagation of updated network information to the leader device 215 and/or router devices 225a, 225b, 225c, 225e in the network 300b. In relatively smaller networks (e.g., residential networks having a relatively smaller number of devices on the network) operating similar to the network illustrated in FIG. 3A, the updated network information may be propagated to other devices in the network relatively quickly (e.g., even seamlessly), as the number of devices competing to use the same sequence number within a period of time may be relatively low. In relatively larger networks (e.g., commercial networks having a relatively larger number of devices on the network) operating similar to the network illustrated in FIG. 3A, the updated network information may be propagated to other devices in the network relatively slowly, as the number of devices competing to use the same sequence number within a period of time may be relatively high and, based on the location of the device in the network, the amount of delay for propagating information to other devices may increase exponentially. This additional processing of advertisement messages shown in the network 300b of FIG. 3B may allow for the propagation of updated network information in larger and smaller networks.

As shown in FIG. 3B, the router device 225a may transmit an advertisement message 318 after processing the advertisement message 316 at 353. The advertisement message 318 may include the updated network information based on the network information in the advertisement message 316 received from router device 225e. As such, the updated network information may be updated at the router device 225a and have a better chance of being transmitted to and/or received by the leader device 215 for updating the network information stored locally thereon for improving network communication. As the advertisement message 318 includes the same sequence number (e.g., sequence number=1) as an advertisement message previously received from a non-leader router device at leader device 215 and router devices 225b, 225e (e.g., sequence number in advertisement message 306), the leader device 215 and the router devices 225b, 225e may fail to process the advertisement message 318 at 319, 319a, and 319b, respectively. However, the updated network information is stored locally at the router device 225a and may be distributed to the leader device 215 in the next successful advertisement message that is processed at the leader device 215 (e.g., when the leader device 215 next updates the sequence number). As a result, the updated network information may be propagated throughout the network more quickly.

Figure 4A:
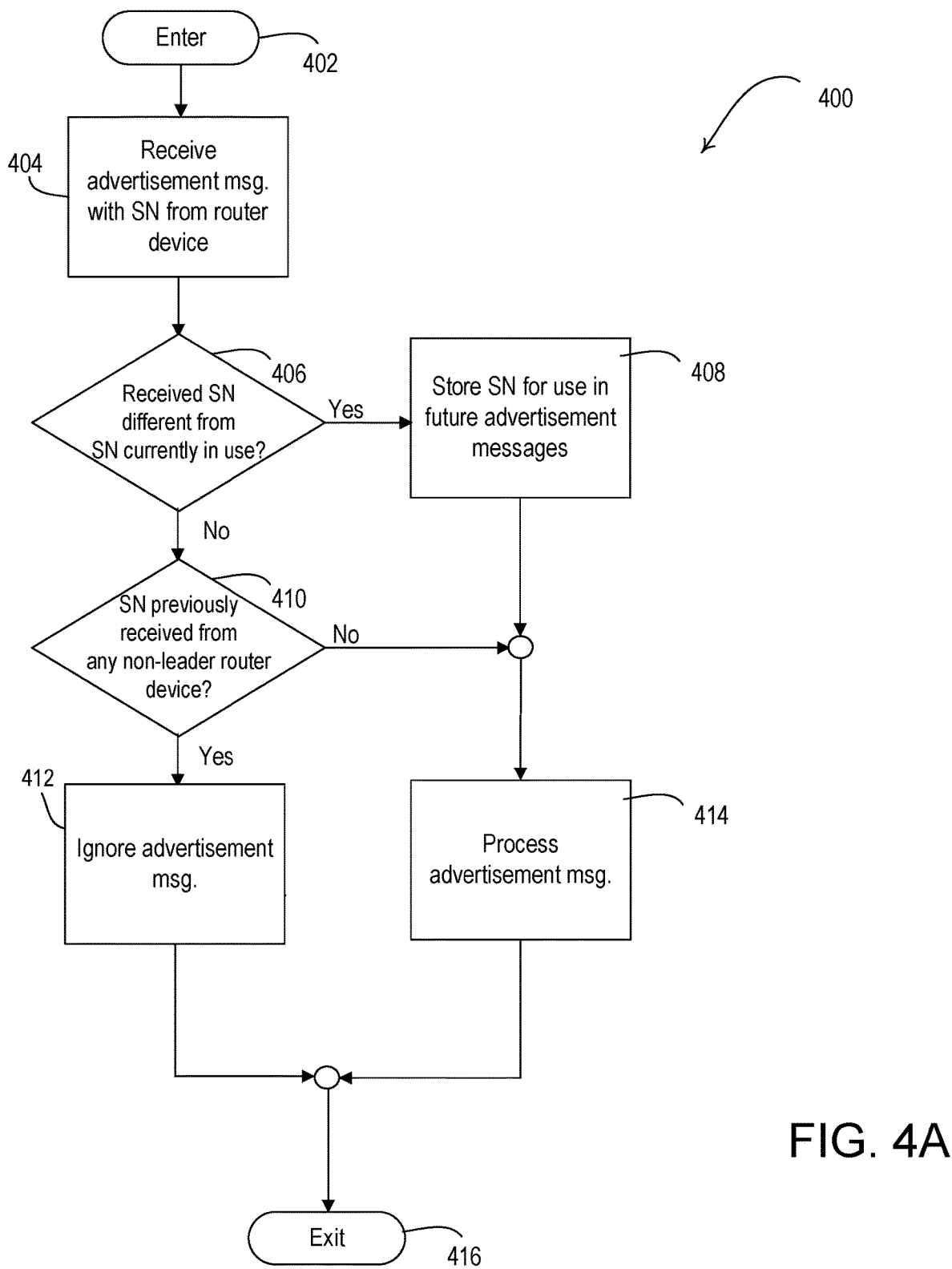
FIGS. 4A and 4B are a flowcharts of an example procedures that may be performed by a router device.

FIG. 4A is a flow diagram of an example procedure 400 for processing advertisement messages. The procedure 400 may be performed by a router device (e.g., leader device or another router device). For example, the router device may enter the procedure 400 at 402 and may receive an advertisement message from another router device at 404. The advertisement message may include a sequence number. At 406, the router device may determine whether the received sequence number in the advertisement message is different from the sequence number currently being used by the router device for transmission of its own advertisement messages. If the received sequence number is different from the sequence number currently stored at the router device for being included in its own advertisement messages, the router device may store the sequence number for being used in future advertisement messages transmitted from the router device at 408.

If the sequence number is recognized as being previously received by the router device, the router device may determine at 410 whether the sequence number was previously received from a non-leader router device. If the sequence number in the advertisement message was previously received in an advertisement message from a non-leader router device, the advertisement message may be ignored and/or discarded. If the sequence number was not previously received in an advertisement message from a non-leader router device (e.g., previously received by a leader device or failed to be previously received), the advertisement message may be processed at 414. The procedure 400 may end at 416.

Figure 4B:
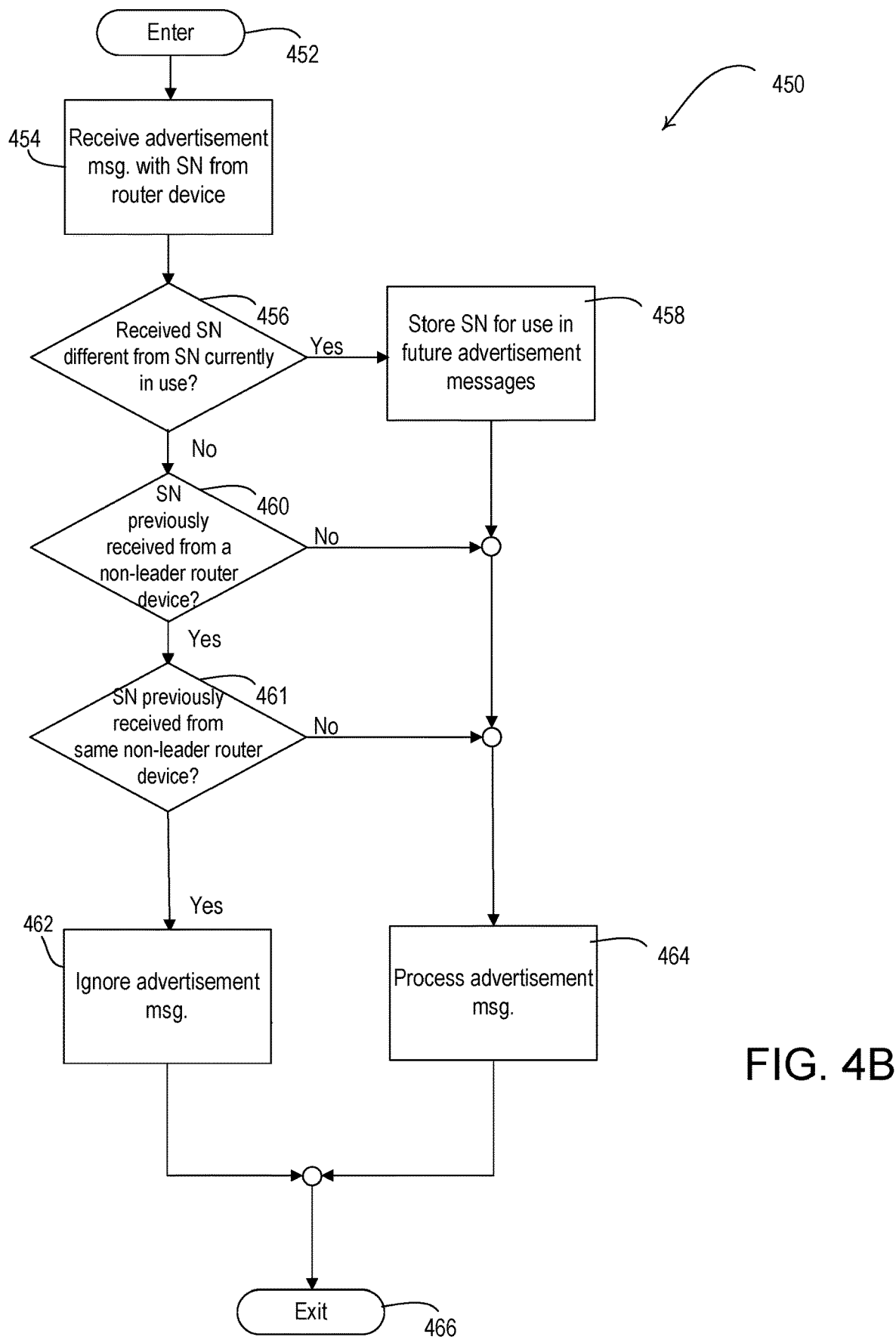

FIG. 4B is a flow diagram of another example procedure 450 for processing advertisement messages. The procedure 450 may be performed by a router device (e.g., leader device or another router device). For example, the router device may enter the procedure 450 at 452 and may receive an advertisement message from another router device at 454. The advertisement message may include a sequence number and/or a router identifier (e.g., or another unique identifier of the router device). At 456, the router device may determine whether the received sequence number in the advertisement message is different from the sequence number currently being used by the router device for transmission of its own advertisement messages. If the received sequence number is different from the sequence number currently stored at the router device for being included in its own advertisement messages, the router device may store the sequence number for being used in future advertisement messages transmitted from the router device at 458.

If the sequence number is recognized as being previously received by the router device, the router device may determine at 460 whether the sequence number was previously received in an advertisement message from a non-leader router device. The sequence number may be compared to the sequence number previously received in advertisement messages from non-leader router devices. If the sequence number in the advertisement message failed to be previously received from a non-leader router device, the advertisement message may be processed at 464. If the sequence number in the advertisement message was previously received in an advertisement message from a non-leader router device, the router device may determine at 461 whether the non-leader router device was the same non-leader router device from which a prior advertisement message was received with the sequence number. For example, the router device may compare the router identifier (e.g., or another unique identifier of the router device) with the router identifier (e.g., or another unique identifier of the router device) of the router device from which advertisement messages were received having the same sequence number. The router device may compare the sequence number and router identifier received in the advertisement message to a table of sequence numbers and router identifiers received in prior advertisement messages. The table may be refreshed after each updated sequence number is identified. If the sequence number was not previously received in an advertisement message transmitted by the same non-leader router device, the advertisement message may be processed at 464. If the sequence number was previously received in an advertisement message transmitted by the same non-leader router device, the advertisement message may be ignored at 462. The procedure 400 may end at 466.

Figure 5:
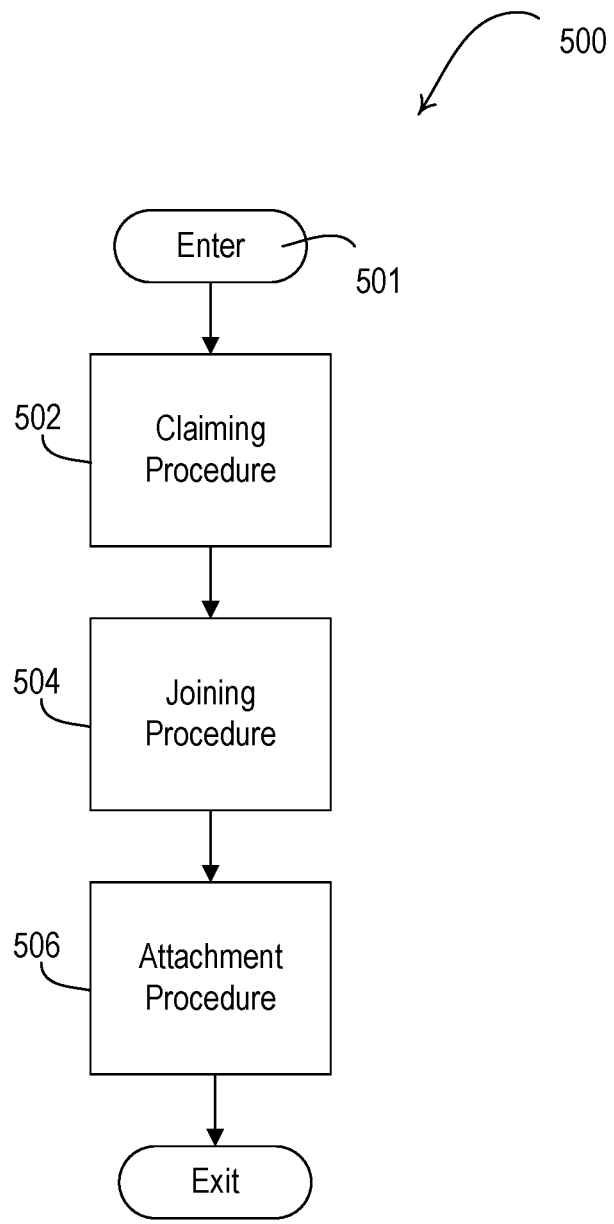
FIG. 5 is a flowchart of an example commissioning procedure that may be performed by a device.

As described herein, a network may be used to facilitate communication between the respective devices of a load control system. For a respective control device to communicate via the network, the control device may be commissioned. FIG. 5 is a flowchart of an example commissioning procedure 500. The procedure 500 may be performed by a control device (e.g., an end device, such as the end devices 230a, 230b, the router eligible end device 240, and/or the sleepy end device 250) that is attempting to join or attach to a network (e.g., the networks 200, 200a, 200b, 200c and/or the network partitions 201, 202, 203). For example, the control device may enter the procedure 500 at 501 when the control device is first powered and attempting to attach/join the network.

At 502, the control device may perform a claiming procedure. The claiming procedure may be used to discover and claim control devices for being added to the network. For example, control devices in the load control system (e.g., load control system 100 shown in FIG. 1) may be claimed using a user's mobile device (e.g., mobile device 190). Each control device may be claimed by a user's mobile device for joining the network and/or attaching to other devices on the network. Each control device may transmit a control device beacon via a short-range wireless communication link (e.g., using BLE technology, nearfield communication (NFC) technology, or other short-range wireless technology). The mobile device may discover (e.g., receive) control device beacons transmitted by the control devices in the load control system. Each control device beacon may include a unique beacon identifier of the control device that transmitted the respective beacon. The unique beacon identifier may be a BLUETOOTH beacon identifier. The unique beacon identifier may include a unique identifier (e.g., serial number) of the control device itself.

The mobile device may identify one or more control device beacons transmitting the beacons at a received signal strength indicator (RSSI) or another communication quality metric above a predefined value. For example, the mobile device may identify one or more of the control device beacons transmitting the strongest RSSI(s) and the mobile device may transmit a connection message to the control device(s). The control device performing the commissioning procedure 500 may receive the connection message from the mobile device may be configured to establish a connection (e.g., a two-way communication connection) with the mobile device.

The connection message may indicate to the control device that the control device has been selected for claiming. The connection message may operate as a claiming message, or a separate claiming message may be sent after the connection is established between the mobile device and the control device. The claiming message may indicate that the control device has been claimed for being added to the network. In response to receiving the claiming message, the control device may transmit a claim confirmation message to the mobile device. The claim confirmation message may include a configuration information that may be used to join or attach the control device to the network. For example, the configuration information may include a unique identifier (e.g., serial number) of the control device and/or network credentials for joining a network or network partition. The network credentials may include a network key for the network, a network address for the control device (e.g., a THREAD network address) and/or a joiner identifier for the control device. The control device may be programmed with the network credentials by receiving the credentials for the network via an RF communication (e.g., BLUETOOTH or other short-range communication) from a commissioning device, or the credentials may be prestored at the control device (e.g., at the time of manufacture). The unique device identifier (e.g., serial number) of the control device may be sent in the claim confirmation message when the unique beacon identifier is not the unique device identifier of the control device. The network address and/or the joiner identifier may be used during the joining procedure to allow the control device to join the network.

During the claiming procedure at 502, or otherwise during the commissioning procedure 500, the mobile device may write information to the control device that is being claimed. For example, the mobile device may write a time the control device was claimed, an identifier of the mobile device and/or application executing a claiming procedure on the mobile device, and/or channel information to assist the control device in getting onto the THREAD network through the joining procedure. The information may be sent in the claiming message or in a separate message on the connection established with the mobile device for being stored at the control device. When the mobile device receives the claim confirmation message from the control device to which the mobile device is connected, the mobile device may store the unique identifier of the control device, the network address for the control device (e.g., a THREAD network address), and/or the joiner identifier for the control device in memory.

The user may continue to move the mobile device around the space in which the load control system is installed to perform the claiming procedure with additional control devices. When the user is done claiming control devices (e.g., the mobile device has claimed all or a portion of the control devices of the load control system), the mobile device may upload the configuration information from the claimed devices to a central computing device, such as a commissioning device, for example. The uploaded configuration information may be used to identify the devices for being joined to the network, or a network partition. The central computing device may be a system controller or other device capable of communicating with other control devices in the load control system. The central computing device may be installed at the space being commissioned, or may be a remote computing device. Though the mobile device is described as the device performing communications with the control device(s) during the claiming procedure at 502, other computing devices may perform similar communications with the control device(s) during the claiming procedure. For example, another computing device, such as the commissioning device or system controller, may perform the communications with the control device(s) to perform the claiming procedure, or portions thereof.

At 504, the control device may perform a joining procedure. During the joining procedure at 504, the control device may look for a network and/or network partition (e.g., THREAD network and/or network partition) to join. The control device may periodically switch between a beaconing mode for being claimed during the claiming procedure at 502 and listening for a network and/or network partition to join during the joining procedure at 504. The control device may begin the joining procedure at 504 after being claimed.

During the joining procedure, the control device may stop transmitting (e.g., periodically transmitting) the control device beacon continuously on a first wireless communication medium (e.g., using BLE technology) and/or a second wireless communication medium (e.g., the wireless communication network). The control device may listen on the wireless communication network to determine if a request to join the wireless communication network is being transmitted on the wireless communication network. The control device may continue to periodically transmit the control device beacon via the first wireless communication medium (e.g., at a slower rate than in the claiming procedure) in case the mobile device attempts to reconnect to the control device while the mobile device is performing the claiming procedure.

The control device may receive a joinder request message from the central computing device or the commissioning device during the joining procedure. The control device may respond with a request to join the network. The central computing device or the commissioning device may challenge the control device with one or more portions of the configuration information obtained during the claiming procedure. For example, the joinder request message, or another message from the central computing device or the commissioning device, may include a request for one or more portions of the network credentials from the user device. In an example, the central computing device or the commissioning device may identify the network address in the network credentials in the joinder request message and request the joiner identifier from the control device. The control device may respond with the joiner identifier or the network address and the joiner identifier to join the network or network partition. The central computing device or the commissioning device may identify the control device from the unique identifier in the message as being a claimed device and confirm the accuracy of the network credentials to join the control device to the network.

At 506, the control device may perform an attachment procedure. After the control device joins the network, the control device may attempt to attach to another device (e.g., a leader device or a router device) on the network to form the mesh network (e.g., formation of the network) at 506. In order to attach to another device on the network, the control device may send and receive a number of messages via the network.

Though FIG. 5 describes a claiming procedure, joining procedure, and attachment procedure, one or more of these procedures may be performed. For example, the claiming procedure and/or the joining procedure may be omitted, or modified, as control devices may have network credentials prestored thereon (e.g., at manufacture or written to storage thereon by another device, such as the mobile device). The network credentials may be used by a control device to directly attach to another device on the network. For example, the network device to which the control device attempts attachment may challenge the control device for the network credentials as described herein. As described herein one or more of the claiming, joining, and/or attachment procedures may be performed after power is provided to a control device and the device is turned on. One or more of these procedures may also be performed to reform the network or reattach control devices to the network.

As described herein, a control device may join a network/network partition and/or attach to another device on the network in order to communicate with the other control devices on the network. However, if the control device attempts to join the network or attach to another device on the network at the same or substantially the same time as other control devices, the likelihood of message collisions may increase and/or the control device may fail to join the network or attach to another device on the network. In an attempt to decrease the likelihood of message collisions, the control device may delay its respective joining or attachment procedure such that control devices join the network and/or attach to other devices on the network sequentially (e.g., rather than simultaneously, which may increase likelihood of message collisions and/or increase the likelihood that a respective control device fails to join or attach to the network). For example, the control devices that are attempting to join the network or attach to other devices on a network may delay their respective joining and/or attachment procedures based on a coordinated startup time. In addition, the coordinated startup time may be individualized for a respective control device, such that the coordinated startup times trigger the control devices to start their respective joinder and/or attachment procedures sequentially.

As part of an initial startup procedure, when a control device is initially powered on and/or attempts to initially attach to another device on a network or network partition (e.g., initial attachment after initially being powered on after being configured and/or reconfigured) the device may perform a startup procedure that is coordinated with other devices on the network or network partition. As an initial startup procedure may be performed at a control device prior to the control device joining a network and/or establishing a role on the network for performing communications, a coordinated startup of the devices on the network may be performed to decrease latency and/or potential collisions of messages on the network as devices are attempting to perform a joining and/or attachment procedure.

Figure 6:
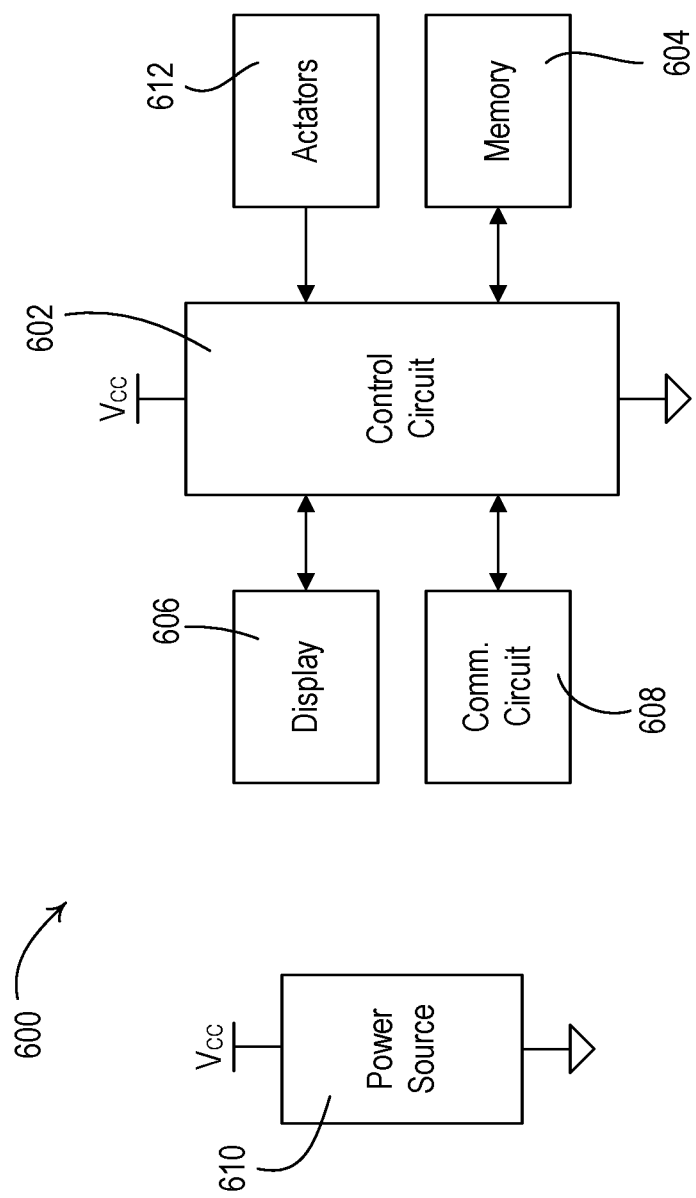
FIG. 6 is a block diagram of an example mobile device.

FIG. 6 is a block diagram illustrating an example mobile device 600 as described herein. The mobile device 600 may include a control circuit 602 for controlling the functionality of the mobile device 600. The control circuit 602 may include one or more general purpose processors, special purpose processors, conventional processors, digital signal processors (DSPs), microprocessors, integrated circuits, a programmable logic device (PLD), application specific integrated circuits (ASICs), or the like. The control circuit 602 may perform signal coding, data processing, power control, input/output processing, or any other functionality that enables the mobile device 600 to perform as described herein. The control circuit 602 may store information in and/or retrieve information from the memory 604. The memory 604 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The mobile device 600 may include a communications circuit 608 for transmitting and/or receiving information. The communications circuit 608 may perform wireless and/or wired communications. The communications circuit 608 may include an RF transceiver or other circuit capable of performing wireless communications via an antenna. Communications circuit 608 may be in communication with control circuit 602 for transmitting and/or receiving information.

The control circuit 602 may also be in communication with a display 606 for providing information to a user. The control circuit 602 and/or the display 606 may generate GUIs for being displayed on the mobile device 600. The display 606 and the control circuit 602 may be in two-way communication, as the display 606 may include a touch screen module capable of receiving information from a user and providing such information to the control circuit 602. The mobile device 600 may also include an actuator 612 (e.g., one or more buttons) that may be actuated by a user to communicate user selections to the control circuit 602.

Each of the modules within the mobile device 600 may be powered by a power source 610. The power source 610 may include an AC power supply or DC power supply, for example. The power source 610 may generate a supply voltage $V_{CC}$ for powering the modules within the mobile device 600.

Figure 7:
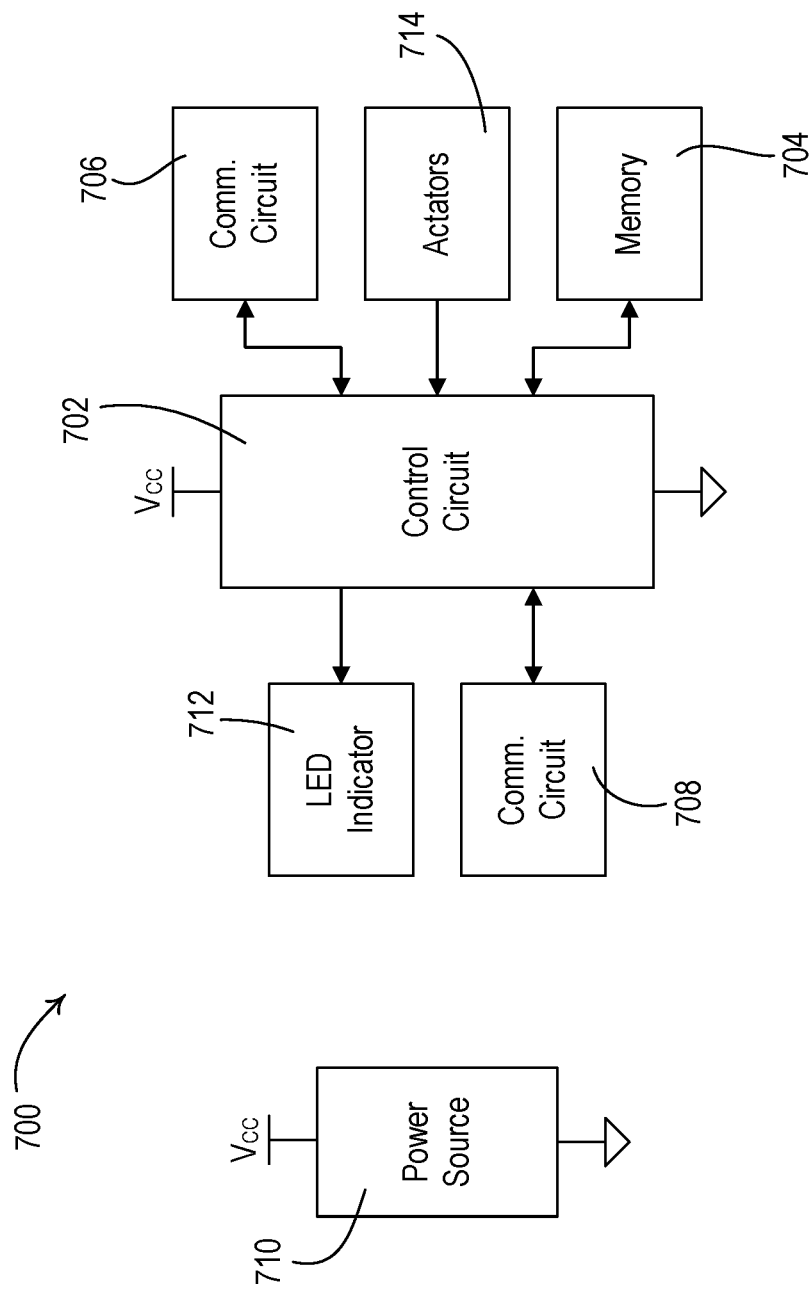
FIG. 7 is a block diagram of an example system controller.

FIG. 7 is a block diagram illustrating an example system controller 700 as described herein. The system controller may be a gateway system controller, a target system controller, a remote system controller, and/or a combination thereof. The system controller 700 may include a control circuit 702 for controlling the functionality of the system controller 700. The control circuit 702 may include one or more general purpose processors, special purpose processors, conventional processors, digital signal processors (DSPs), microprocessors, integrated circuits, a programmable logic device (PLD), application specific integrated circuits (ASICs), or the like. The control circuit 702 may perform signal coding, data processing, power control, input/output processing, or any other functionality that enables the system controller 700 to perform as described herein. The control circuit 702 may store information in and/or retrieve information from the memory 704. The memory 704 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 700 may include a first communication circuit 706 for transmitting and/or receiving information. The first communication circuit 706 may perform wireless and/or wired communications on a first wireless communication link and/or network (e.g., a network wireless communication link). The system controller 700 may also, or alternatively, include a second communication circuit 708 for transmitting and/or receiving information. The second communication circuit 706 may perform wireless and/or wired communications via a second wireless communication link and/or network (e.g., a short-range wireless communication link). The first and second communication circuit 706, 708 may be in communication with control circuit 702. The communication circuits 706, 708 may include RF transceivers or other communications modules capable of performing wireless communications via an antenna. The communication circuit 706 and communication circuit 708 may be capable of performing communication via the same communication channels or different communication channels. For example, the first communication circuit 708 may be capable of communicating (e.g., with control devices and/or other devices in the load control system) via the first wireless communication link and/or network using a first communication protocol (e.g., a wireless communication protocol, such as CLEAR CONNECT and/or THREAD protocols) And the and the second communication circuit 708 may be capable of communicating via the second wireless communication channel and/or network using a second wireless communication protocol.

The control circuit 702 may be in communication with an LED indicator 712 for providing indications to a user. The control circuit 702 may be in communication with an actuator 714 (e.g., one or more buttons) that may be actuated by a user to communicate user selections to the control circuit 702. For example, the actuator 714 may be actuated to put the control circuit 702 in an association mode and/or communicate association messages from the system controller 700.

Each of the modules within the system controller 700 may be powered by a power source 710. The power source 710 may include an AC power supply or DC power supply, for example. The power source 710 may generate a supply voltage $V_{CC}$ for powering the modules within the system controller 700.

Figure 8:
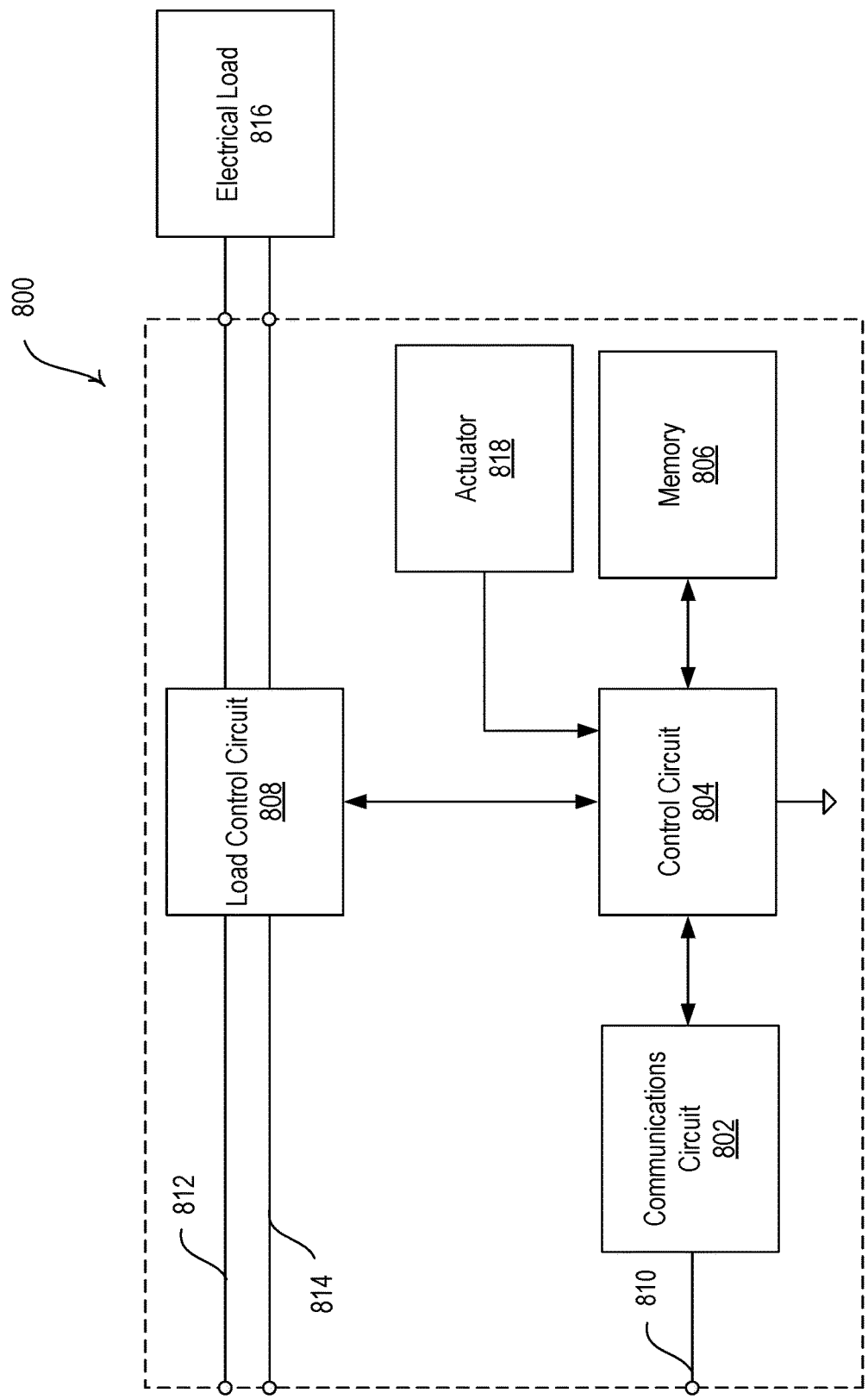
FIG. 8 is a block diagram of an example load control device.

FIG. 8 is a block diagram illustrating an example control-target device, e.g., a load control device 800, as described herein. The load control device 800 may be a dimmer switch, an electronic switch, an electronic lighting control device for lamps, an LED driver for LED light sources or other lighting control device, an AC plug-in load control device, a temperature control device (e.g., a thermostat), a motor drive unit for a motorized window treatment, or other load control device. The load control device 800 may include a communication circuit 802. The communication circuit 802 may include a receiver, an RF transceiver, or other communication module capable of performing wired and/or wireless communication via communication link 810. The communication circuit 802 may be in communication with control circuit 804. The control circuit 804 may include one or more general purpose processors, special purpose processors, conventional processors, digital signal processors (DSPs), microprocessors, integrated circuits, a programmable logic device (PLD), application specific integrated circuits (ASICs), or the like. The control circuit 804 may perform signal coding, data processing, power control, input/output processing, or any other functionality that enables the load control device 800 to perform as described herein.

The control circuit 804 may store information in and/or retrieve information from the memory 806. For example, the memory 806 may maintain a registry of associated control devices and/or control configuration instructions. The memory 806 may include a non-removable memory and/or a removable memory. The load control circuit 1408 may receive instructions from the control circuit 804 and may control an electrical load 816 based on the received instructions. The load control circuit 808 may send status feedback to the control circuit 804 regarding the status of the electrical load 816. The load control circuit 1408 may receive power via the hot connection 812 and the neutral connection 814 and may provide an amount of power to the electrical load 816. The electrical load 816 may include any type of electrical load, such as a lighting load (e.g., LED, fluorescent lamp, etc.).

The control circuit 804 may be in communication with an actuator 818 (e.g., one or more buttons) that may be actuated by a user to communicate user selections to the control circuit 804. For example, the actuator 818 may be actuated to put the control circuit 804 in an association mode and/or communicate association messages from the load control device 800.

Figure 9:
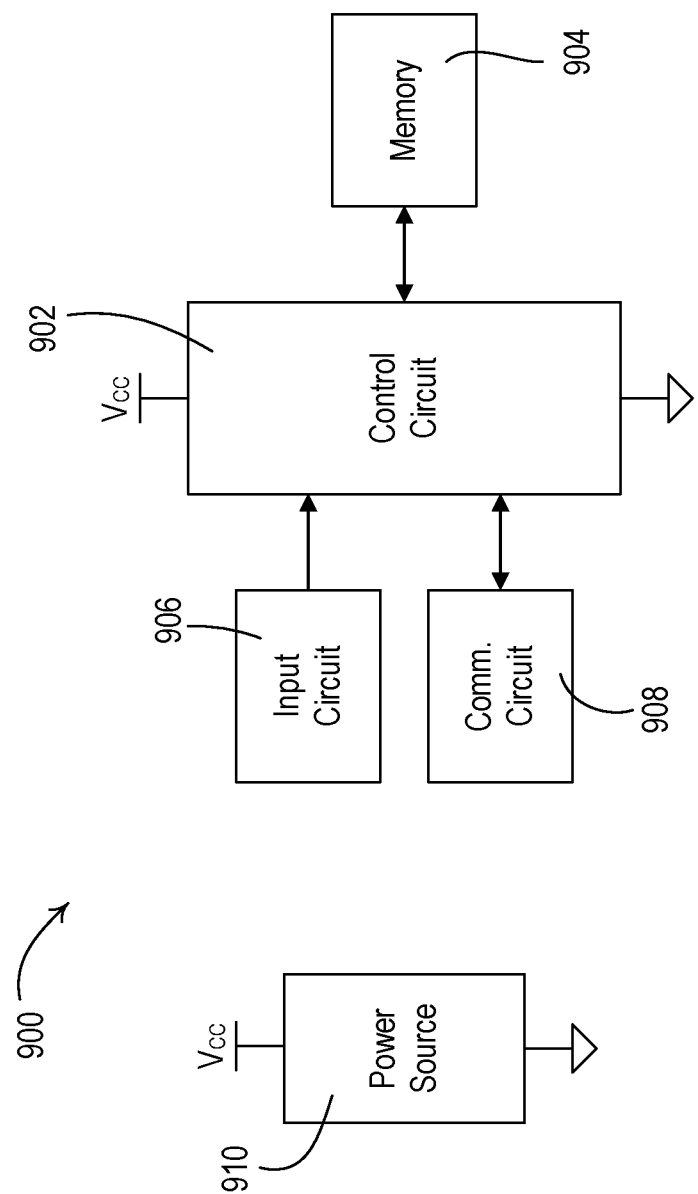
FIG. 9 is a block diagram of an example input device.

FIG. 9 is a block diagram illustrating an example input device 900, or control-source device, as described herein. The input device 900 may be a remote control device, an occupancy sensor, a daylight sensor, a temperature sensor, and/or the like. The input device 900 may include a control circuit 902 for controlling the functionality of the input device 900. The control circuit 902 may include one or more general purpose processors, special purpose processors, conventional processors, digital signal processors (DSPs), microprocessors, integrated circuits, a programmable logic device (PLD), application specific integrated circuits (ASICs), or the like. The control circuit 902 may perform signal coding, data processing, power control, input/output processing, or any other functionality that enables the input device 900 to perform as described herein.

The control circuit 902 may store information in and/or retrieve information from the memory 904. The memory 904 may include a non-removable memory and/or a removable memory, as described herein.

The input device 900 may include a communication circuit 908 for transmitting and/or receiving information. The communication circuit 908 may transmit and/or receive information via wired and/or wireless communication. The communication circuit 908 may include a transmitter, an RF transceiver, or other circuit capable of performing wired and/or wireless communication. The communication circuit 908 may be in communication with control circuit 902 for transmitting and/or receiving information.

The control circuit 902 may also be in communication with an input circuit 906. The input circuit 906 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 906 to put the control circuit 902 in an association mode and/or communicate association messages from the control-source device. The control circuit 902 may receive information from the input circuit 906 (e.g., an indication that a button has been actuated or sensed information). Each of the modules within the input device 900 may be powered by a power source 910.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method for processing advertisement messages in a load control system comprising a plurality of control devices communicating on a network, the method comprising:

receiving a first advertisement message from a first control device of the plurality of control devices, wherein the first control device is operating as a first router device on the network, wherein the first advertisement message comprises a router identifier of the first control device and a sequence number;

processing the first advertisement message;

storing the router identifier of the first control device and the sequence number;

receiving a second advertisement message from a second control device of the plurality of control devices, wherein the second control device is operating as a second router device on the network, wherein the second advertisement message comprises a router identifier of the second control device and a sequence number; and determining that the sequence number of the first advertisement message is the same as the sequence number of the second advertisement message and that the router identifier of the first advertisement message is different than the router identifier of the second advertisement message;

in response to the determination that the sequence number of the first advertisement message is the same as the sequence number of the second advertisement message and that the router identifier of the first advertisement message is different than the router identifier of the second advertisement message, processing the second advertisement message;

wherein the first advertisement message comprises network information related to the first network device, and wherein the second advertisement message comprises network information related to the second network device, wherein the sequence numbers are configured to be incremented after a period of time to allow the first router device and the second router device to identify updated network information transmitted in advertisement messages;

receiving, via the network, a message configured to control an electrical load; and in response to the message, controlling the electrical load.

2. The method of claim 1, wherein the first control device comprises a first load control device, and wherein the second control device comprises an input device, wherein the message configured to control the electrical load is received from the input device, wherein the message configured to control the electrical load comprises a first message, and wherein controlling the electrical load comprises transmitting a second message to the first load control device to control the electrical load.

3. The method of claim 1, wherein:

the first advertisement message is received at a third control device of the plurality of control devices operating as a third router device on the network;

the first advertisement message is processed at the third control device;

the router identifier of the first control device and the sequence number are stored at the third control device;

the second advertisement message is received at the third control device;

the third control device determines that the sequence number of the first advertisement message is the same as the sequence number of the second advertisement message and that the router identifier of the first advertisement message is different than the router identifier of the second advertisement message;

in response to the determination that the sequence number of the first advertisement message is the same as the sequence number of the second advertisement message and that the router identifier of the first advertisement message is different than the router identifier of the second advertisement message, the third control device processes the second advertisement message;

the third control device receives the message configured to control the electrical load; and in response to the message, the third control device controls the electrical load.

4. The method of claim 3, further comprising:

determining that the sequence number of the first advertisement message is different than a prior sequence number being used in transmission of advertisement messages from the third control device, wherein the sequence number of the first advertisement message is stored for transmission of subsequent advertisement messages from the third control device; and transmitting at least one advertisement message from the third control device that includes the sequence number of the first advertisement message.

5. The method of claim 1, wherein the first control device comprises a leader device on the network, and wherein the second control device comprises a non-leader router device on the network.

6. The method of claim 1, further comprising:

receiving a third advertisement message from the second control device, wherein the third advertisement message comprises the router identifier of the second control device and a sequence number, and wherein the sequence number of the third advertisement message is different than the sequence number of the second advertisement message; and based on the sequence number of the third advertisement message being different than the sequence number of the second advertisement message, processing the third advertisement message.

7. The method of claim 1, further comprising:

receiving a third advertisement message from the second control device, wherein the third advertisement message comprises a router identifier and a sequence number;

determining that the sequence number of the third advertisement message is the same as the sequence number of the second advertisement message and that the router identifier that is received in the third advertisement message is the router identifier of the second control device that is received in the second advertisement message; and in response to the determination that the sequence number of the third advertisement message is the same as the sequence number of the second advertisement message and that the router identifier that is received in the third advertisement message is the router identifier of the second control device that is received in the second advertisement message, ignoring the third advertisement message.

8. The method of claim 1, wherein the processing of the first advertisement message from the first control device comprises updating a locally-stored router table based on network information associated with the first control device in the first advertisement message, and wherein the processing of the second advertisement message from the second control device comprises updating the locally-stored router table at the first control device based on network information associated with the second control device in the second advertisement message.

9. The method of claim 8, wherein the network information associated with the first control device comprises at least one of a link quality, link cost, or path cost for communicating messages on a communication link via the first control device, and wherein the network information associated with the second control device comprises at least one of a link quality, link cost, or path cost for communicating messages on a communication link via the second control device.

10. The method of claim 1, wherein the electrical load comprises at least one lighting load.

11. A device configured to communicate via a network, the device comprising:

a communication circuit; and a control circuit configured to:

receive, via the network from the communication circuit, a first advertisement message from a first control device of a plurality of control devices configured to operate on the network, wherein the first advertisement message indicates that the first control device is configured to operate as a first router device on the network, wherein the first advertisement message comprises a router identifier of the first control device and a sequence number;

process the first advertisement message;

store the router identifier of the first control device and the sequence number;

receive, via the network from the communication circuit, a second advertisement message from a second control device of the plurality of control devices, wherein the second advertisement message indicates that the second control device is configured to operate as a second router device on the network, wherein the second advertisement message comprises a router identifier of the second control device and a sequence number;

determine that the sequence number of the first advertisement message is the same as the sequence number of the second advertisement message and that the router identifier of the first advertisement message is different than the router identifier of the second advertisement message;

in response to the determination that the sequence number of the first advertisement message is the same as the sequence number of the second advertisement message and that the router identifier of the first advertisement message is different than the router identifier of the second advertisement message, process the second advertisement message;

wherein the first advertisement message comprises network information related to the first network device, the second advertisement message comprises network information related to the second network device, and wherein the sequence numbers are configured to be incremented after a period of time to identify updated network information in advertisement messages received from the first router device and the second router device;

receive, via the network from the communication circuit, a message configured to control an electrical load; and in response to the message, control the electrical load.

12. The device of claim 11, wherein the first control device comprises a first load control device, and wherein the second control device comprises at least one of an input device or a second load control device.

13. The device of claim 12, wherein the second control device comprises the input device, and wherein the message configured to control the electrical load is configured to be received from the input device.

14. The device of claim 13, wherein the message configured to control the electrical load comprises a first message, and wherein the control circuit being configured to control the electrical load comprises the control circuit being configured to transmit a second message via the communication circuit to the first load control device to control the electrical load.

15. The device of claim 11, wherein the control circuit is further configured to:

determine that the sequence number of the first advertisement message is different than a prior sequence number being used in transmission of advertisement messages, wherein control circuit is configured to store the sequence number of the first advertisement message for use in transmission of subsequent advertisement messages.

16. The device of claim 15, wherein the control circuit is further configured to:

transmit, via the communication circuit, at least one advertisement message that includes the sequence number of the first advertisement message.

17. The device of claim 11, wherein the first control device comprises a leader device on the network, and wherein the second control device comprises a non-leader router device on the network.

18. The device of claim 11, wherein the control circuit is further configured to:

receive a third advertisement message from the second control device, wherein the third advertisement message comprises the router identifier of the second control device and a sequence number, and wherein the sequence number of the third advertisement message is different than the sequence number of the second advertisement message; and based on the sequence number of the third advertisement message being different than the sequence number of the second advertisement message, process the third advertisement message.

19. The device of claim 11, wherein the control circuit is further configured to:

receive a third advertisement message from the second control device, wherein the third advertisement message comprises a router identifier and a sequence number;

determine that the sequence number of the third advertisement message is the same as the sequence number of the second advertisement message and that the router identifier that is received in the third advertisement message is the router identifier of the second control device that is received in the second advertisement message; and in response to the determination that the sequence number of the third advertisement message is the same as the sequence number of the second advertisement message and that the router identifier that is received in the third advertisement message is the router identifier of the second control device that is received in the second advertisement message, ignore the third advertisement message.

20. The device of claim 11, wherein the control circuit being configured to process the first advertisement message from the first control device further comprises the control circuit being configured to update a locally-stored router table based on network information associated with the first control device in the first advertisement message, and wherein the control circuit being configured to process the second advertisement message from the second control device further comprises the control circuit being configured to update the locally-stored router table based on network information associated with the second control device in the second advertisement message.

21. The device of claim 20, wherein the network information associated with the first control device comprises at least one of a link quality, link cost, or path cost for communicating messages on a communication link via the first control device, and wherein the network information associated with the second control device comprises at least one of a link quality, link cost, or path cost for communicating messages on a communication link via the second control device.

22. The device of claim 11, wherein the electrical load comprises at least one lighting load.

23. At least one non-transitory computer-readable medium having computer-executable instructions stored thereon that, when executed by a control circuit, are configured to cause the control circuit to:

receive a first advertisement message from a first control device of a plurality of control devices configured to operate on a network, wherein the first advertisement message indicates that the first control device is configured to operate as a first router device on the network, wherein the first advertisement message comprises a router identifier of the first control device and a sequence number;

process the first advertisement message;

store the router identifier of the first control device and the sequence number;

receive a second advertisement message from a second control device of the plurality of control devices, wherein the second advertisement message indicates that the second control device is configured to operate as a second router device on the network, wherein the second advertisement message comprises a router identifier of the second control device and a sequence number;

determine that the sequence number of the first advertisement message is the same as the sequence number of the second advertisement message and that the router identifier of the first advertisement message is different than the router identifier of the second advertisement message;

in response to the determination that the sequence number of the first advertisement message is the same as the sequence number of the second advertisement message and that the router identifier of the first advertisement message is different than the router identifier of the second advertisement message, process the second advertisement message;

wherein the first advertisement message comprises network information related to the first network device, and wherein the second advertisement message comprises network information related to the second network device, wherein the sequence numbers are configured to be incremented after a period of time to identify updated network information in advertisement messages received from the first router device and the second router device;

receive a message configured to control an electrical load; and in response to the message, control the electrical load.

24. The at least one non-transitory computer-readable medium of claim 23, wherein the first control device comprises a first load control device, and wherein the second control device comprises an input device, wherein the message configured to control the electrical load is configured to be received from the input device, wherein the message configured to control the electrical load comprises a first message, and wherein the instructions being configured to cause the control circuit to control the electrical load comprises the instructions being configured to cause the control circuit to transmit a second message to the first load control device to control the electrical load.

25. The at least one non-transitory computer-readable medium of claim 23, wherein the instructions are further configured to cause the control circuit to: determine that the sequence number of the first advertisement message is different than a prior sequence number being used in transmission of advertisement messages;

store the sequence number of the first advertisement message for use in transmission of subsequent advertisement messages; and transmit at least one advertisement message that includes the sequence number of the first advertisement message.

26. The at least one non-transitory computer-readable medium of claim 23, wherein the first control device comprises a leader device on the network, and wherein the second control device comprises a non-leader router device on the network.

27. The at least one non-transitory computer-readable medium of claim 23, wherein the instructions are further configured to cause the control circuit to:

receive a third advertisement message from the second control device, wherein the third advertisement message comprises the router identifier of the second control device and a sequence number, and wherein the sequence number of the third advertisement message is different than the sequence number of the second advertisement message; and based on the sequence number of the third advertisement message being different than the sequence number of the second advertisement message, process the third advertisement message.

28. The at least one non-transitory computer-readable medium of claim 23, wherein the instruction are further configured to cause the control circuit to:

receive a third advertisement message from the second control device, wherein the third advertisement message comprises a router identifier and a sequence number;

determine that the sequence number of the third advertisement message is the same as the sequence number of the second advertisement message and that the router identifier that is received in the third advertisement message is the router identifier of the second control device that is received in the second advertisement message; and in response to the determination that the sequence number of the third advertisement message is the same as the sequence number of the second advertisement message and that the router identifier that is received in the third advertisement message is the router identifier of the second control device that is received in the second advertisement message, ignore the third advertisement message.

29. The at least one non-transitory computer-readable medium of claim 23, wherein the control circuit being configured to process the first advertisement message from the first control device further comprises the control circuit being configured to update a locally-stored router table based on network information associated with the first control device in the first advertisement message, and wherein the control circuit being configured to process the second advertisement message from the second control device further comprises the control circuit being configured to update the locally-stored router table based on network information associated with the second control device in the second advertisement message.

30. The at least one non-transitory computer-readable medium of claim 29, wherein the network information associated with the first control device comprises at least one of a link quality, link cost, or path cost for communicating messages on a communication link via the first control device, and wherein the network information associated with the second control device comprises at least one of a link quality, link cost, or path cost for communicating messages on a communication link via the second control device.

31. The at least one non-transitory computer-readable medium of claim 23, wherein the electrical load comprises at least one lighting load.

* * * * *